United States Patent
Raghavan et al.

(10) Patent No.: US 11,658,704 B2
(45) Date of Patent: May 23, 2023

(54) TECHNIQUES FOR MANAGING BEAMS USING SPECTRAL EFFICIENCY ESTIMATES OF TWO PORT REFERENCE SIGNALS

(71) Applicant: QUALCOMM Incorporated, San Diego, CA (US)

(72) Inventors: Vasanthan Raghavan, West Windsor Township, NJ (US); Raghu Narayan Challa, San Diego, CA (US); Mihir Vijay Laghate, San Diego, CA (US); Yuan Gao, San Diego, CA (US); Jun Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/534,785

(22) Filed: Nov. 24, 2021

(65) Prior Publication Data

US 2022/0247455 A1 Aug. 4, 2022

Related U.S. Application Data

(60) Provisional application No. 63/143,440, filed on Jan. 29, 2021.

(51) Int. Cl.
*H04B 7/005* (2006.01)
*H04W 24/02* (2009.01)
*H04B 7/24* (2006.01)

(52) U.S. Cl.
CPC ............... *H04B 7/005* (2013.01); *H04B 7/24* (2013.01); *H04W 24/02* (2013.01)

(58) Field of Classification Search
CPC ........ H04B 7/005; H04B 7/24; H04B 7/0628; H04B 7/0695; H04B 7/088; H04B 7/10; H04W 24/02
See application file for complete search history.

(56) References Cited

U.S. PATENT DOCUMENTS

| 10,715,237 | B1 * | 7/2020 | Landis | H04B 7/0626 |
| 2017/0331535 | A1 * | 11/2017 | Wei | H04B 7/0469 |
| 2018/0063693 | A1 * | 3/2018 | Chakraborty | H04W 48/16 |

(Continued)

FOREIGN PATENT DOCUMENTS

WO   WO-2019195047 A1   10/2019

OTHER PUBLICATIONS

International Search Report and Written Opinion—PCT/US2021/072615—ISA/EPO—dated Mar. 29, 2022.

*Primary Examiner* — Jae Y Lee
(74) *Attorney, Agent, or Firm* — Dalei Dong; Holland & Hart LLP

(57) ABSTRACT

Methods, systems, and devices for wireless communications are described. In some examples, a base station and a user equipment (UE) may utilize multi-port reference signals to determine a beam pair for rank-2 transmissions. For example, a UE may receive a set of multi-port reference signals, where each multi-port reference signal of the set corresponds to a unique beam pair and is received via two ports associated with two different polarizations. The UE may determine a spectral efficiency estimation for each multi-port reference signal of the set, select a beam pair associated with a multi-port reference signal with the highest determined spectral efficiency estimation of the set, and transmit an indication of the selected beam pair to the base station. Therefore, the UE and the base station may communicate using a beam pair which maximizes the spectral efficiency and rate of rank-2 transmissions.

30 Claims, 15 Drawing Sheets

(56) References Cited

U.S. PATENT DOCUMENTS

2018/0351621 A1* 12/2018 Wei .................. H04B 7/0639
2019/0280784 A1* 9/2019 Kwak ................ H04W 72/046
2020/0304178 A1* 9/2020 Wei .................. H04B 7/0452

* cited by examiner

TECHNIQUES FOR MANAGING BEAMS USING SPECTRAL EFFICIENCY ESTIMATES OF TWO PORT REFERENCE SIGNALS

CROSS REFERENCE

The present Application for Patent claims the benefit of U.S. Provisional Patent Application No. 63/143,440 by RAGHAVAN et al., entitled "TECHNIQUES FOR MANAGING BEAMS USING SPECTRAL EFFICIENCY ESTIMATES OF TWO PORT REFERENCE SIGNALS," filed Jan. 29, 2021, assigned to the assignee hereof, and which is hereby incorporated by reference in its entirety.

FIELD OF DISCLOSURE

The present disclosure, for example, relates to wireless communications systems, more particularly to techniques for managing beams using spectral efficiency estimates of two port reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a base station and a UE may utilize synchronization signal block (SSB) measurements for beam management operations. For example, a UE may measure a signal strength associated with each SSB received from the base station using potentially unique directional beams, select a beam pair corresponding to the SSB with highest signal strength, and transmit an indication of the selected beam pair to the base station. As such, the UE and the base station may communicate using a beam pair link which maximizes signal strength of rank-1 transmissions corresponding to SSBs.

SUMMARY

The described techniques relate to improved methods, systems, devices, and apparatuses that support techniques for managing beams using spectral efficiency estimates of two port reference signals. Generally, the described techniques provide for a user equipment (UE) to determine spectral efficiency estimates of two port reference signals received from a base station using potentially unique directional beams and select a beam pair corresponding to a two port reference signal with the highest determined spectral efficiency estimate for subsequent communications with a base station. The UE may determine spectral efficiency estimates of each two port reference signal using signal strength information or phase information associated with each two port reference signal.

A method for wireless communications at a UE is described. The method may include receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE, determining an estimate of spectral efficiency for each multi-port reference signal of the set of multiple multi-port reference signals based on the receiving, selecting a beam pair for communications with the base station based on the determined estimate of spectral efficiency for each multi-port reference signal, and transmitting an indication of the selected beam pair to the base station.

An apparatus for wireless communications at a UE is described. The apparatus may include a processor, memory coupled with the processor, and instructions stored in the memory. The instructions may be executable by the processor to cause the apparatus to receive, from a base station, a set of multiple multi-port reference signals, where each of the set of multiple multi-port reference signals is received at a first port associated with a first polarization using a first directional beam of the UE and at a second port associated with a second polarization using a second directional beam of the UE, determine an estimate of spectral efficiency for each multi-port reference signal of the set of multiple multi-port reference signals based on the receiving, select a beam pair for communications with the base station based on the determined estimate of spectral efficiency for each multi-port reference signal, and transmit an indication of the selected beam pair to the base station.

Another apparatus for wireless communications at a UE is described. The apparatus may include means for receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE, means for determining an estimate of spectral efficiency for each multi-port reference signal of the set of multiple multi-port reference signals based on the receiving, means for selecting a beam pair for communications with the base station based on the determined estimate of spectral efficiency for each multi-port reference signal, and means for transmitting an indication of the selected beam pair to the base station.

A non-transitory computer-readable medium storing code for wireless communications at a UE is described. The code may include instructions executable by a processor to receive, from a base station, a set of multiple multi-port reference signals, where each of the set of multiple multi-port reference signals is received at a first port associated with a first polarization using a first directional beam of the UE and at a second port associated with a second polarization using a second directional beam of the UE, determine an estimate of spectral efficiency for each multi-port reference signal of the set of multiple multi-port reference signals based on the receiving, select a beam pair for communications with the base station based on the determined estimate of spectral efficiency for each multi-port reference signal, and transmit an indication of the selected beam pair to the base station.

Some examples of the method, apparatuses, and non-transitory computer-readable medium described herein may further include operations, features, means, or instructions for determining a capability of the UE to use multi-port reference signals for beam management and transmitting, to the base station, a message indicating the capability of the UE to use multi-port reference signals for beam management, where the estimate of spectral efficiency may be determined based on the capability of the UE to use multi-port reference signals for beam management.

Some examples of the method, apparatuses, and non-transitory computer-readable medium described herein may further include operations, features, means, or instructions for receiving the set of multiple multi-port reference signals in response to the transmitted message indicating the capability of the UE to use multi-port reference signals for beam management.

In some examples of the method, apparatuses, and non-transitory computer-readable medium described herein, determining the estimate of spectral efficiency may include operations, features, means, or instructions for determining a phase information for each multi-port reference signal of the set of multiple multi-port reference signals.

In some examples of the method, apparatuses, and non-transitory computer-readable medium described herein, the phase information for each multi-port reference signal of the set of multiple multi-port reference signals includes a relative phase information for each multi-port reference signal of the set of multiple multi-port reference signals with respect to a baseline phase.

In some examples of the method, apparatuses, and non-transitory computer-readable medium described herein, determining the phase information may include operations, features, means, or instructions for determining the phase information using a phase-locked loop (PLL) component of a circuit of the UE based on a capability of the UE to use multi-port reference signals for beam management, the phase information corresponding to both the first polarization and the second polarization of the UE.

In some examples of the method, apparatuses, and non-transitory computer-readable medium described herein, the circuit includes a radio frequency integrated circuit (RFIC).

Some examples of the method, apparatuses, and non-transitory computer-readable medium described herein may further include operations, features, means, or instructions for determining a lower bound of the estimate of spectral efficiency for each multi-port reference signal of the set of multiple multi-port reference signals based on a capability of the UE and an estimate of the phase information.

In some examples of the method, apparatuses, and non-transitory computer-readable medium described herein, the estimate of the phase information includes a worst-case phase estimate for each multi-port reference signal of the set of multiple multi-port reference signals.

In some examples of the method, apparatuses, and non-transitory computer-readable medium described herein, the lower bound of the estimate of spectral efficiency corresponds to a spectral efficiency estimate below a threshold.

In some examples of the method, apparatuses, and non-transitory computer-readable medium described herein, determining the estimate of spectral efficiency may include operations, features, means, or instructions for determining respective signal strengths for each multi-port reference signal of the set of multiple multi-port reference signals, where a respective estimate of spectral efficiency for each of the set of multiple multi-port reference signals may be determined based on a respective signal strength.

In some examples of the method, apparatuses, and non-transitory computer-readable medium described herein, determining the respective signal strengths may include operations, features, means, or instructions for determining respective reference signal received power (RSRP) values or signal-to-noise ratio (SNR) values for each multi-port reference signal of the set of multiple multi-port reference signals.

In some examples of the method, apparatuses, and non-transitory computer-readable medium described herein, determining the estimate of spectral efficiency may include operations, features, means, or instructions for determining respective estimates of spectral efficiency for a set of polarization mappings for each multi-port reference signal of the set of multi-port reference signals, each polarization mapping of the set of polarization mappings corresponding to a different mapping between one of the first polarization or the second polarization at the UE and one of the first polarization or the second polarization at the base station.

In some examples of the method, apparatuses, and non-transitory computer-readable medium described herein, the different mapping includes one of a mapping between the first polarization of the UE and the first polarization of the base station, a mapping between the second polarization of the UE and the second polarization of the base station, a mapping between the first polarization of the UE and the second polarization of the base station, or a mapping between the second polarization of the UE and the first polarization of the base station.

In some examples of the method, apparatuses, and non-transitory computer-readable medium described herein, selecting the beam pair may include operations, features, means, or instructions for selecting the beam pair corresponding to a multi-port reference signal of the set of multiple multi-port reference signals associated with a greatest spectral efficiency of a set of spectral efficiencies for the set of multiple multi-port reference signals.

In some examples of the method, apparatuses, and non-transitory computer-readable medium described herein, transmitting the indication of the selected beam pair may include operations, features, means, or instructions for transmitting a feedback message including a transmission configuration indicator (TCI) indicative of the selected beam pair.

In some examples of the method, apparatuses, and non-transitory computer-readable medium described herein, each of the set of multiple multi-port reference signals includes a two-port channel state information (CSI) reference signal (CSI-RS).

In some examples of the method, apparatuses, and non-transitory computer-readable medium described herein, the two-port CSI-RS includes a periodic CSI-RS or an aperiodic CSI-RS.

In some examples of the method, apparatuses, and non-transitory computer-readable medium described herein, the first directional beam and the second directional beam may include a beam that is associated with any set of beam weights or set of beam parameters for transmission of a signal.

A method for wireless communications at a base station is described. The method may include receiving, from a UE, a message indicating a capability of the UE to use multi-port reference signals for beam management, transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station, and receiving, from the UE, an indication of a beam pair for communications between the UE and the base station based on transmitting.

An apparatus for wireless communications at a base station is described. The apparatus may include a processor, memory coupled with the processor, and instructions stored in the memory. The instructions may be executable by the processor to cause the apparatus to receive, from a UE, a message indicating a capability of the UE to use multi-port reference signals for beam management, transmit, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station, and receive, from the UE, an indication of a beam pair for communications between the UE and the base station based on transmitting.

Another apparatus for wireless communications at a base station is described. The apparatus may include means for receiving, from a UE, a message indicating a capability of the UE to use multi-port reference signals for beam management, means for transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station, and means for receiving, from the UE, an indication of a beam pair for communications between the UE and the base station based on transmitting.

A non-transitory computer-readable medium storing code for wireless communications at a base station is described. The code may include instructions executable by a processor to receive, from a UE, a message indicating a capability of the UE to use multi-port reference signals for beam management, transmit, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station, and receive, from the UE, an indication of a beam pair for communications between the UE and the base station based on transmitting.

In some examples of the method, apparatuses, and non-transitory computer-readable medium described herein, receiving the indication of the beam pair may include operations, features, means, or instructions for receiving a feedback message including a TCI indicative of the beam pair.

In some examples of the method, apparatuses, and non-transitory computer-readable medium described herein, each of the set of multiple multi-port reference signals includes a two-port CSI-RS.

In some examples of the method, apparatuses, and non-transitory computer-readable medium described herein, the two-port CSI-RS includes a periodic CSI-RS or an aperiodic CSI-RS.

DETAILED DESCRIPTION

Figure 1:
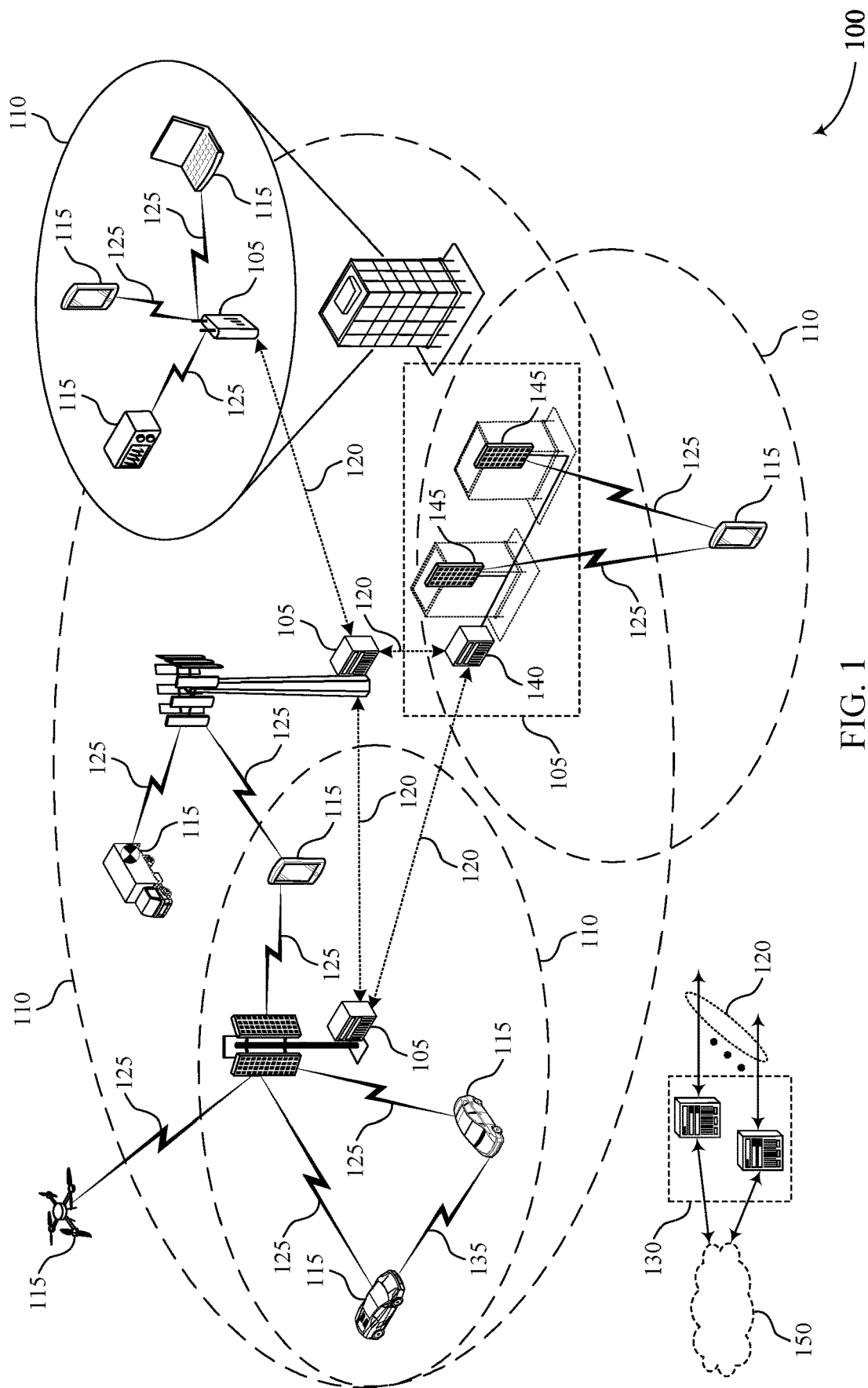
FIGS. 1 and 2 illustrate examples of a wireless communications system that supports techniques for managing beams using spectral efficiency estimates of two port reference signals in accordance with various aspects of the present disclosure.

In some examples, a base station and a user equipment (UE) may perform beam management operations to determine a best beam pair for communications between the UE and the base station. For example, using different methods, a UE may determine signal strength measurements (e.g., reference signal received power (RSRP) values) for a set of synchronization signal blocks (SSBs) received from the base station using potentially unique directional beams and select a beam pair corresponding to the SSB with the highest signal measurement of the set of SSBs. In some examples, the UE and the base station may operate in a multiple-input multiple-output (MIMO) mode. That is, the UE and the base station may concurrently transmit or receive signals via two or more antenna ports (or layers) associated with two polarizations or two or more spatial modes. Because SSBs are rank-1 transmissions, using SSBs for beam management operations while the UE and the base station are operating in the MIMO mode may result in the UE selecting a beam pair that has the highest signal measurement value of a mixed signal across polarizations. As such, the beam pair selected by the UE using SSB signal measurements may not be the best beam pair for MIMO transmissions (e.g., rank-2 transmissions) in terms of spectral efficiency or achievable rate.

In some examples, the base station and the UE may utilize multi-port reference signals when performing beam management operations. An example of a multi-port reference signal may be a two port channel state information (CSI) reference signal (CSI-RS). The base station may transmit a set of multi-port reference signals to the UE using potentially unique directional beams, where each multi-port reference signal may be transmitted via two or more ports associated with two or more polarities. Similarly, the UE may receive the series of multi-port reference signal using unique directional beams, where each multi-port reference signal is received via two or more ports associated with two polarizations or two or more spatial modes. The UE may determine a spectral efficiency for each multi-port reference signal based on signal strength measurements (e.g., RSRP values or signal-to-noise ratio (SNR) values) and phase information associated with each of the multi-port reference signals and select a beam pair corresponding to the multi-port reference signal with the highest spectral efficiency of the set. The UE may then transmit an indication of the selected beam pair to the base station and the base station and the UE may utilize the selected beam pair for subsequent communications (e.g., rank-2 transmissions). That is, the UE and the base station may communicate via a beam pair that maximizes spectral efficiency or achievable rate.

Aspects of the disclosure are initially described in the context of wireless communications systems. Additional aspects of the disclosure are described in the context of process flows. Aspects of the disclosure are further illustrated by and described with reference to apparatus diagrams, system diagrams, and flowcharts that relate to techniques for managing beams using spectral efficiency estimates of two port reference signals.

FIG. 1 illustrates an example of a wireless communications system 100 that supports techniques for managing beams using spectral efficiency estimates of two port reference signals in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In another example, a UE 115 may include or be referred to as a repeater device, a relay device, an intelligent reflecting surface (IRS) node, a reconfigurable intelligent surface (RIS) node, or a meta-surface.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where D $f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, or other control signals) may be transmitted by a base station 105 multiple times in different directions. For example, the base station 105 may transmit a signal according to different sets of beamforming weights associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency or analog beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional reception) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different sets of receive beamforming weights (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on signal strengths in different receive configuration directions (e.g., a beam direction determined to have a highest signal strength, highest SNR, or otherwise acceptable signal quality from multiple beam directions).

In some examples, the base station 105 and the UE 115 may utilize multi-port reference signals to determine a best beam for communications between the UE 115 and the base station 105. For example, the UE 115 may receive a set of two port reference signals from the base station 105 using potentially unique directional beams, determine a spectral efficiency estimate associated with each two port reference signal of the set, and select a beam pair corresponding to a two port reference signal with a highest determined spectral efficiency of the set for subsequent communications with a base station 105. The UE 115 may determine the spectral efficiency estimates of each two port reference signal using signal strength information or phase information associated with each two port reference signal.

Figure 2:
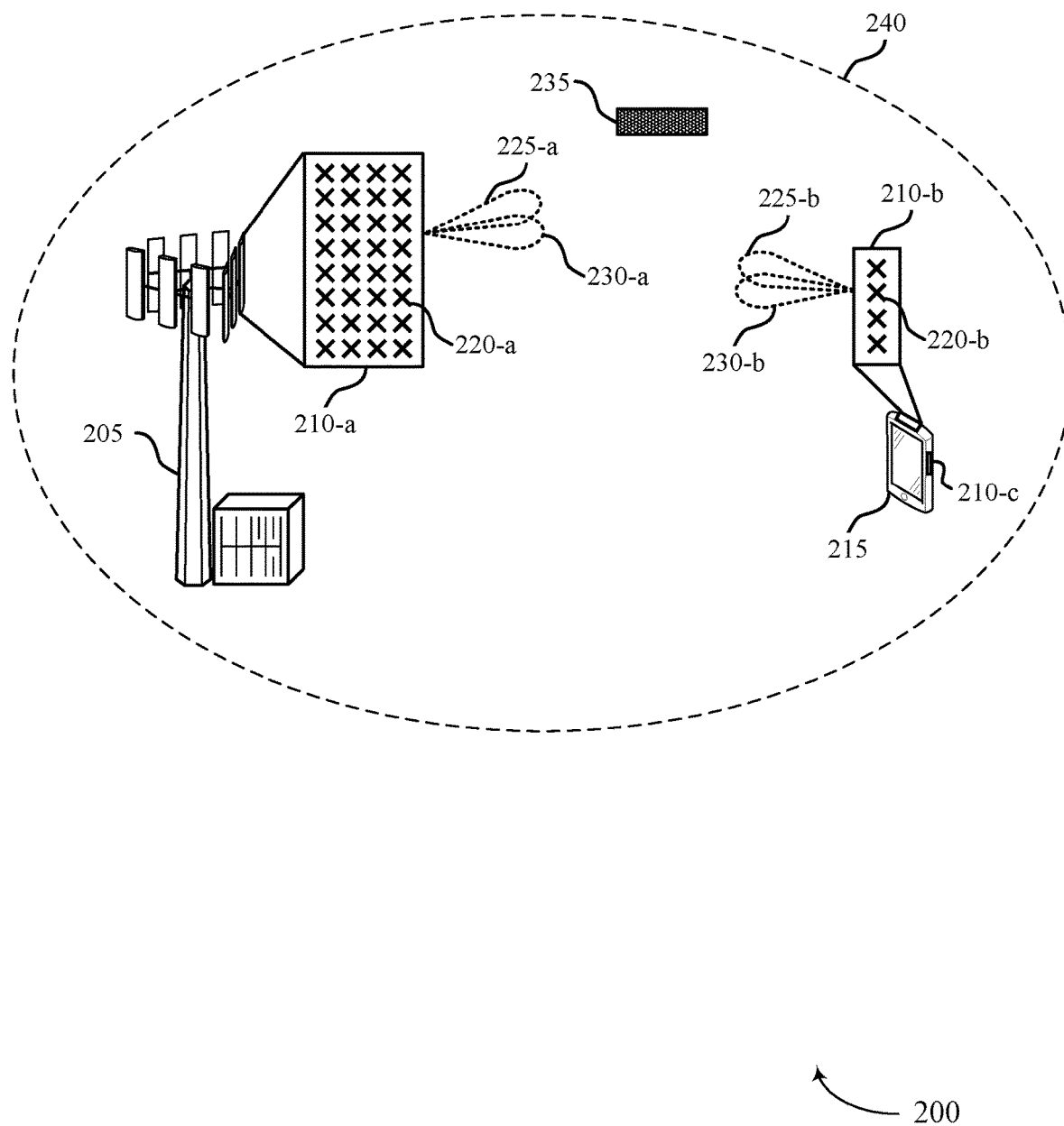

FIG. 2 illustrates an example of a wireless communications system 200 that supports techniques for managing beams using spectral efficiency estimates of two port reference signals in accordance with various aspects of the present disclosure. In some examples, the wireless communications system 200 may implement aspects of a wireless communications system 100. For example, the wireless communications system 200 may include a base station 205 and a UE 215 which may be examples of a base station 105 and a UE 115 as described with reference to FIG. 1. In some examples, the wireless communications system 200 may include a coverage area 240 and a reflection 235. The reflection 235 may be an example of a building or a cluster which may, in some cases, interfere with signal or channel propagation.

In some examples, the base station 205 and the UE 215 may perform beam management operations. For example, using different techniques, the base station 205 may transmit a series of SSBs using potentially unique directional beams to the UE 215. In response, the UE 215 may determine a signal strength value (e.g., an RSRP value) associated with each respective SSB and identify which SSB is associated with the highest signal strength value. The UE 215 may then transmit an indication of the directional beams associated with the identified SSB (e.g., beam pair) to the base station 205 and the base station 205 and the UE 215 may utilize the directional beams (e.g., beam pair) for subsequent communications.

In some examples, the base station 205 and the UE 215 may be capable of operating in a MIMO mode. For example, the base station 205 may include a panel 210-a and the UE 215 may include panel 210-b and panel 210-c. The panel 210-a may include four columns of antenna elements 220-a and the panel 210-b and the panel 210-c may include one column of antenna elements 220-b. In some examples, the panels 210 may be examples of dual-polarization antenna arrays or antenna panels. That is, each column may transmit two signals via two ports (e.g., or layers) associated with two different polarizations (e.g., vertical and horizontal polar-izations, or slant 45 and −45 polarizations, or left-circular or right-circular polarizations). For example, the base station 205 may split a data stream into two data streams and simultaneously transmit the two data streams via two ports associated with two different polarizations to the UE 215. The UE 215 may receive the two data streams via two antenna ports associated with two different polarizations and combine the two data streams in an effort to obtain the original data stream.

As described above, the base station 205 and the UE 215 may utilize SSB measurements to determine a beam pair for subsequent communications. SSBs may be examples of rank-1 transmissions. That is, although the UE 215 and the base station 205 may be capable of MIMO transmissions (e.g., simultaneous transmission/reception of signals over different polarizations), the UE 215 and the base station 205 may operate as though they are not capable of MIMO transmissions and polarizations may be mixed at both ends of the link when transmitting/receiving the SSBs. As such, the UE 215 may determine a signal strength value associated with a mixed signal across polarizations. Although using SSB measurements may give an accurate indication of the best beam pair for rank-1 transmissions between the base station 205 and the UE 215, they might not give an accurate indication of the best beam pairs for rank-2 transmissions (or real MIMO transmissions). That is, using SSB measurement for beam pair selection may not maximize spectral efficiency or achievable rate of rank-2 transmissions.

In some examples, the base station 205 and the UE 215 may utilize a two port reference signal (e.g., a two port CSI-RS) to determine a beam pair for MIMO transmissions. The base station 205 may transmit a two port reference signal using two directional beams and the UE 215 may receive the two port reference signal using two directional beams. For example, the base station 205 may transmit a two port reference signal using a directional beam 225-a over a first polarization (e.g., Pol-0) and a directional beam 230-a over a second polarization (e.g., Pol-1). The UE 215 may receive the two port reference signal using a directional beam 225-b over the first polarization (e.g., Pol-0) and a directional beam 230-b over the second polarization (e.g., Pol-1). In some examples, the directional beam 225-a and the directional beam 230-a may point in a same direction or a similar direction. Similarly, the directional beam 225-b and the directional beam 230-b may point in a same direction or a similar direction. That is, the UE 215 and the base station 205 may apply the same codebook (or beam weights) across different polarizations. Alternately, the UE 215 and the base station 205 may use polarization-adjusted codebooks of beam weights for transmissions over the two ports. In some examples, a directional beam (e.g., the directional beam 225-a, the directional beam 230-a, the directional beam 225-b, or the directional beam 230-b) may refer to a beam that is associated with any set of beam weights (e.g., any generic set of beam weights that are used over a multi-element array) or any set of beam parameters. While operating in FR3, the base station 205 and the UE 215 may not support beam steering (e.g., highly directional beams), but may apply a set of beam weights or a set of beam parameters to beams for purpose of transmitting signals. As such, the beams utilized for communication in FR3 may be referred to as directional beams.

When using the two port reference signal for beam management, the base station 205 may transmit a series of two port reference signals, each corresponding to a unique beam pair and the UE 215 may select a beam pair corresponding to the two port reference signal with the highest spectral efficiency for subsequent communications with the base station 205. In some examples, the UE 215 may determine (e.g., estimate) the spectral efficiency for each two port reference signal using characteristics of the two port reference signal. For example, the UE 215 may determine an RSRP value, an SNR value, or phase information associated with each two port reference signal and use these values to calculate spectral efficiency. Once the UE 215 has selected the beam pair, the UE 215 may transmit a feedback message to the base station indicating the selected beam pair. For example, the UE 215 may transmit a CSI report message including a transmission configuration indicator (TCI) state representative of the selected beam pair.

In some examples, a capability of the UE 215 associated with radio frequency (RF) circuitry that allows for different types of beam management may affect the method in which the UE 215 and the base station 205 perform beam management operations. For example, if the UE 215 is an example of a low capability UE, the UE 215 may be unable to utilize two port reference signals for beam management operations. As such, the UE 215 may utilize SSBs for beam management operations. Alternatively, if the UE 215 is an example of an intermediate capability UE, the UE 215 may have the ability to utilize two port reference signals for beam management operations, but may be unable to make accurate cross-port phase estimates of the received two port reference signals. As such, the UE 215 may assume a worst-case estimate for this phase quantity and use the worst-case estimate to determine a lower bound for the spectral efficiency. The worst-case phase estimation may refer to phases of the two-port reference signals which may result in the lowest estimated value of spectral efficiency. Alternatively, if the UE 215 is an example of a high capability UE, the UE 215 may be capable of utilizing two port reference signals for beam management operations and may be capable of making accurate cross-point phase estimates of each two port reference signal using a phase-locked loop (PLL) component that is stable and accurately measures the cross-port phases. As such, the UE 215 may determine spectral efficiency using the cross-point phase estimates from the PLL component. In some examples, the UE 215 may indicate the beam management capability (e.g., low capability, intermediate capability, or high capability) to the base station 205 via signaling and the base station 205 may determine whether to transmit a series of SSBs or a series of two port reference signals for beam management operations based on the beam management capability signaling from the UE 215. The base station 205 may also subsequently prepare for rate or power control operations based on the reported quantities by the UE 215.

Figure 3:
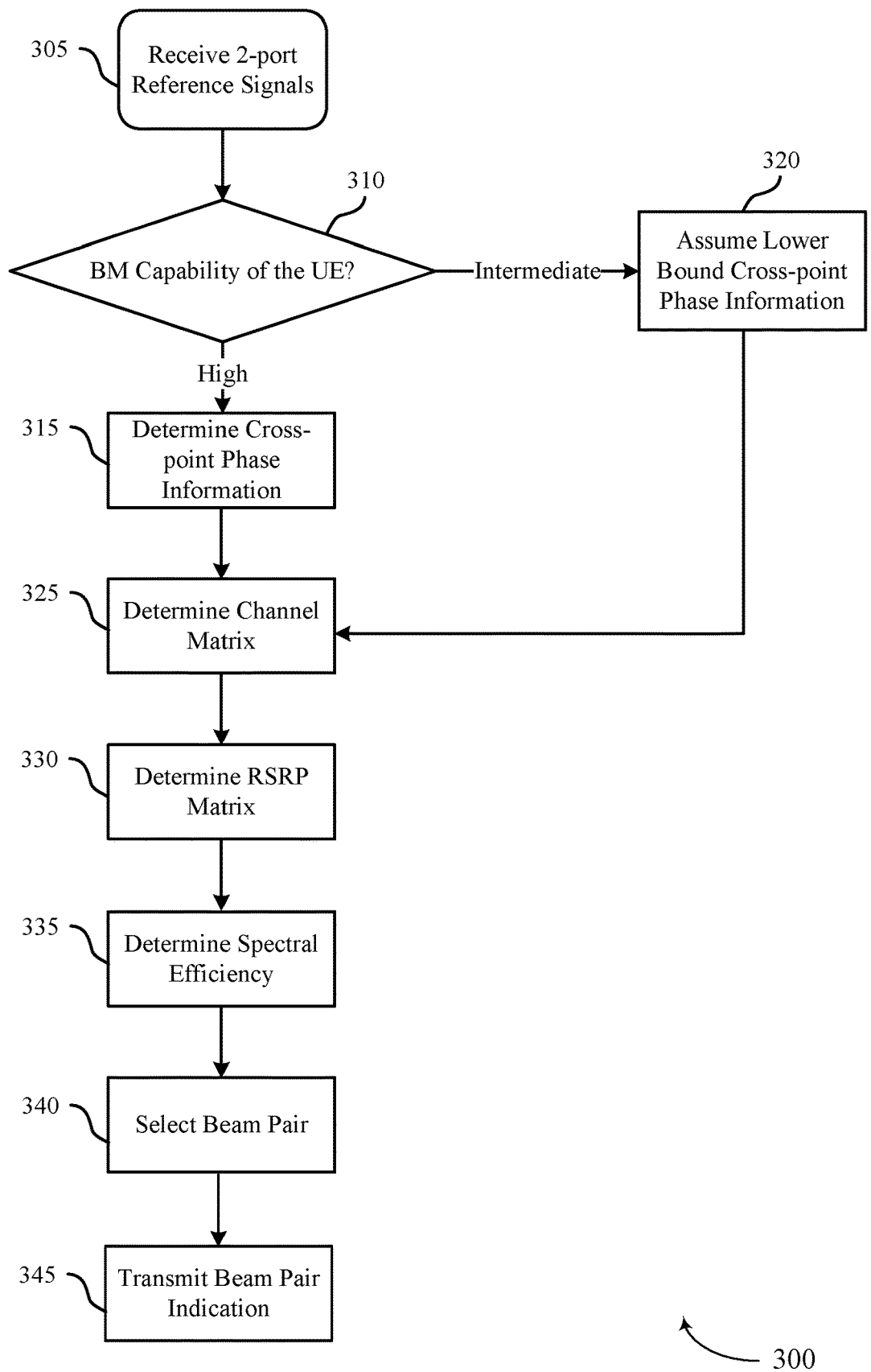
FIG. 3 illustrates an example of a flow chart that supports techniques for managing beams using spectral efficiency estimates of two port reference signals in accordance with various aspects of the present disclosure.

FIG. 3 illustrates an example of a flow chart 300 that supports techniques for managing beams using spectral efficiency estimates of two port reference signals in accordance with various aspects of the present disclosure. In some examples, the flow chart 300 may implement aspects of a wireless communications system 100 and a wireless communications system 200. For example, the flow chart 300 may be implemented at a UE, such as a UE 115 as described with reference to FIG. 1 or a UE 215 with reference to FIG. 2.

At 305, the UE may receive a two port reference signal of a set of two port reference signals from a base station, where each two port reference signal corresponds to a unique beam pair. For example, the base station may transmit the two port reference signal using two directional beams, each associated with a respective polarization (e.g., Pol-0 and Pol-1) and the UE may receive the two port reference signal using two directional beams, each associated with a respective polarization (e.g., Pol-0 and Pol-1). In some examples, the two port reference signal may be an example of a two port CSI-RS.

As described with reference to FIG. 2, using different methods, the UE may be an example of a UE with low beam management capability. In such cases, the UE may receive a set of SSBs (as opposed to a set of two port reference signals) using directional receive beams at the UE.

At 310, the UE may determine its beam management capability. For example, the UE may determine a high capability for performing beam management operations or an intermediate capability for performing beam management operations.

At 315, the UE may determine a high capability for performing management operations. In addition, the UE may include a stable PLL component and may utilize the PLL component to determine phase information for each two port reference signal of the set of two port reference signals.

At 320, the UE may determine an intermediate capability for performing beam management operations. In addition, the UE may assume worst-case phase information for each two port reference signals of the set of two port reference signals At 325, the UE may determine a channel matrix for the two port reference signals corresponding to different polarization mappings. For example, Equation 1 shows a 2×2 channel matrix when the UE has Pol-0 and Pol-1 and the base station has Pol-0 and Pol-1, where $g_i$ represent the beam weights (directional beam) used at the UE with the index i corresponding to the i-th beam from the codebook at the UE end, $f_j$ represents the beam weights (directional beam) used at the base station with the index j corresponding to the j-th beam at the base station end, $H_{00}$ represents the channel between Pol-0 at the base station and Pol-0 at the UE, $H_{01}$ represents the channel between Pol-1 at the base station and Pol-0 at the UE, $H_{10}$ represents the channel between Pol-0 at the base station and Pol-1 at the UE, and $H_{11}$ represents the channel between Pol-1 at the base station and Pol-1 at the UE. The UE may determine a channel matrix for each two port reference signal of the set of two port reference signals (as seen from the digital, baseband, or modem perspective). Although this example illustrates that the same codebook (beam weights) may be used at the UE and the base station across different polarizations, the techniques described herein may also be applied and easily generalized to different codebooks used by the UE and the base station over different polarizations.

$$H_{ij} = \begin{bmatrix} g_i^H H_{00} f_j & g_i^H H_{01} f_j \\ g_i^H H_{10} f_j & g_i^H H_{11} f_j \end{bmatrix} \quad (1)$$

At 330, the UE may determine an RSRP matrix for the two port reference signal based on the channel matrix determined at 325. For example, Equation 2 shows a 2×2 RSRP matrix based on the channel matrix of Equation 1 for a UE with intermediate beam management capability. Equation 3 shows a 2×2 RSRP matrix based on the channel matrix of Equation 1 for a UE with high beam management capability. The UE may determine a channel matrix for each two port reference signal of the set of two port reference signals.

$$H_{i,j} = \begin{bmatrix} |g_i^H H_{00} f_j|^2 & |g_i^H H_{01} f_j|^2 \\ |g_i^H H_{10} f_j|^2 & |g_i^H H_{11} f_j|^2 \end{bmatrix} \quad (2)$$

$$H_{i,j} = \begin{bmatrix} g_i^H H_{00} f_j & g_i^H H_{01} f_j \\ g_i^H H_{10} f_j & g_i^H H_{11} f_j \end{bmatrix} \quad (3)$$

In some examples, the UE may have low beam management capability. In such case, using different techniques, the UE may determine an RSRP matrix for each of the SSBs of the set of SSBs as shown in Equation 4.

$$\overline{H}_{i,j} = \begin{bmatrix} |g_i^H (H_{00} + H_{01}) f_j|^2 \\ |g_i^H (H_{10} + H_{11}) f_j|^2 \end{bmatrix} \quad (4)$$

At 335, the UE may determine a spectral efficiency estimate for the two port reference signal based on the channel matrix determined at 325, the RSRP matrix determined at 330, an SNR value of the two port reference signal, and the phase information determined at either 315 or 320. For example, Equation 5 shows the spectral efficiency in terms of the channel matrix of Equation 1. The UE may determine a spectral efficiency estimate (in bits per seconds per Hertz) for each of the two port reference signal of the set of two port reference signals.

$$\text{Spectral Efficiency} = \log_2 \det(I_2 + \tfrac{1}{2} H_{ij} H_{ij}^H) \quad (5)$$

For UEs of intermediate beam management capability, the determined spectral efficiency for each two port reference signal may be a lower bound estimate because the UE assumes worst-case phase information (e.g., when the UE is not capable of measuring cross-port phase relationships). As such, the UE may not be able to determine the rate truly achievable with 2-port transmission. UEs of high beam management capability may be capable of making cross-port phase estimates and as such, may determine the rate truly achievable with 2-port transmissions.

At 340, the UE may select a beam pair which correspond to a two port reference signal with highest spectral efficiency estimate of the set of two port reference signals. For example, Equation 6 shows an expression which allows the UE to determine a beam pair (i*,j*) which maximizes the spectral efficiency.

$$(i^*, j^*) = \text{argmax} \log_2 \det(I_2 + \tfrac{1}{2} H_{ij} H_{ij}^H) \quad (6)$$

At 345, the UE may transmit an indication of the selected beam pair to the base station. For example, the UE may transmit a feedback message to the base station including a TCI state indication of the selected beam pair. As such, the UE may determine a beam pair for rank-2 transmissions that maximizes spectral efficiency and achievable rate.

Figure 4:
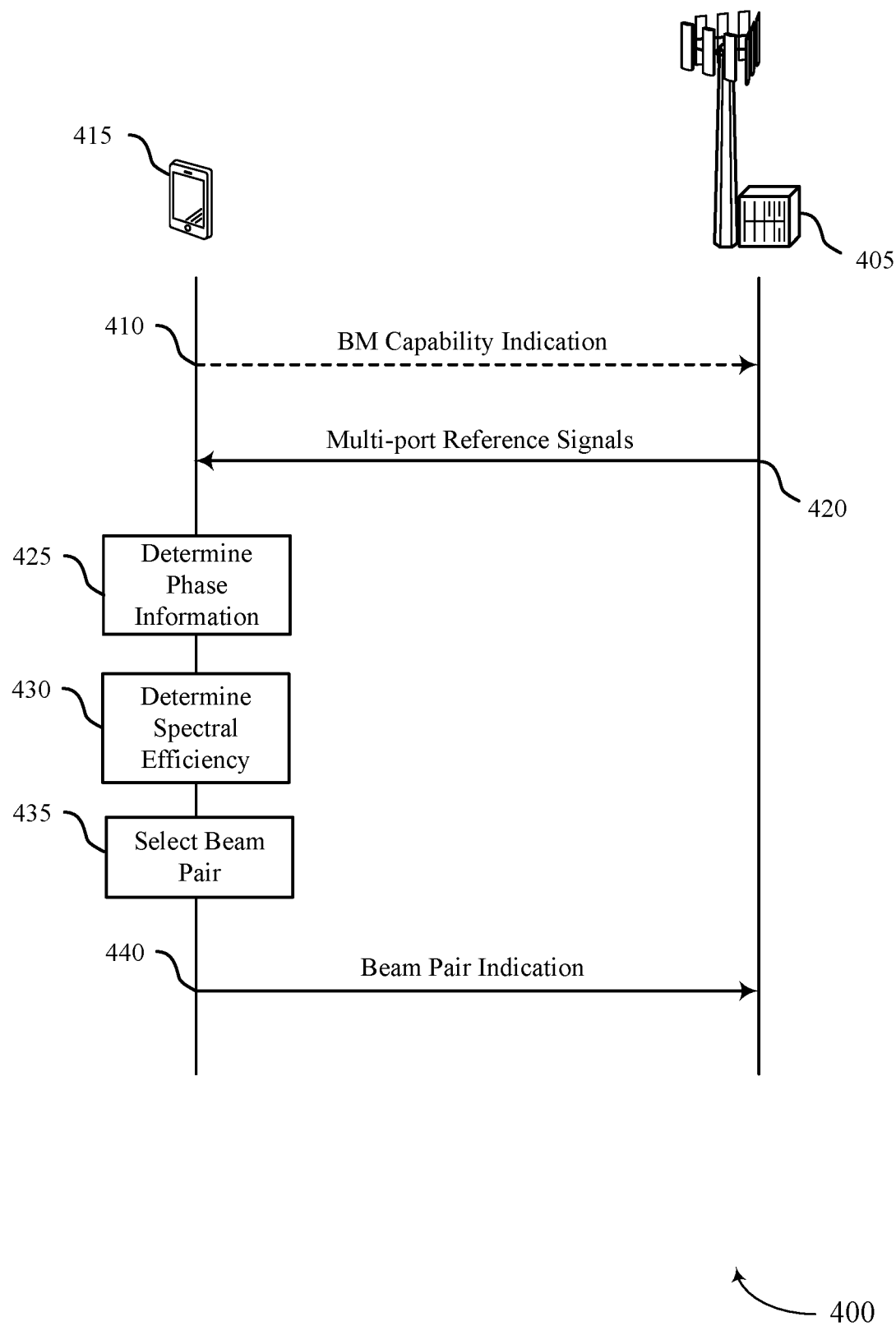
FIG. 4 illustrates an example of a process flow that supports techniques for managing beams using spectral efficiency estimates of two port reference signals in accordance with various aspects of the present disclosure.

FIG. 4 illustrates an example of a process flow 400 that supports techniques for managing beams using spectral efficiency estimates of two port reference signals in accordance with various aspects of the present disclosure. In some examples, process flow 400 may implement aspects or may be implemented by aspects of a wireless communications system 100, a wireless communications system 200, or a flow chart 300. For example, the process flow 400 may be implemented by a UE 415 and a base station 405 which may be examples of a UE 115, a UE 215, a base station 105, or a base station 205 as described with reference to FIGS. 1 and 2. Alternative examples of the following may be implemented, where some steps are performed in a different order than described or are not performed at all. In some cases, steps may include additional features not mentioned below, or further steps may be added.

At 410, the UE 415 may transmit a beam management capability indication to the base station 405. In some examples, the beam management capability indication may indicate whether the UE 415 may utilize multi-port reference signals (e.g., two port CSI-RS) for beam management procedures. Further, the beam management capability indication may indicate if the UE 415 is capable of measuring cross-point phase information of multi-port reference signals.

At 420, the UE 415 may receive a set of multi-port reference signals from the base station 405, where each multi-port reference signal corresponds to a unique beam pair. In some examples, receiving a multi-port reference signal of the set of multi-port reference signals may include receiving the multiple port reference via two directional beams associated with two different polarizations (e.g., Pol-0 and Pol-1). In some examples, the set of multi-port reference signals may be transmitted to the UE 415 periodically. In other examples, the set of multiple-port reference signals may be transmitted to the UE 415 aperiodically. In some examples, transmission of the multi-port reference signals may be triggered at the base station 405 by the beam management capability indication received at 410.

At 425, the UE 415 may determine phase information associated with each of the multi-port reference signals. In some examples, the UE 415 may be capable of estimating cross-port phase information associated with each multi-port reference signal (e.g., if the UE 415 has high beam management capability). In other examples, the UE 415 may not be capable of estimating cross-port phase information of each multi-port and may instead assume worst-case phase information to compute an estimate of a lower bound to the spectral efficiency.

At 430, the UE 415 may determine a spectral efficiency estimate for each multi-port reference signal of the set of multi-port reference signals. In some examples, the UE 415 may determine the spectral efficiency estimate for each respective multi-port reference signal based on the phase information determined at 425, a respective SNR value, or a respective RSRP value.

At 435, the UE 415 may select a beam pair for subsequent communication with the base station 405. In some examples, the UE 415 may select the beam pair that corresponds to the multi-port reference signal of the set with highest spectral efficiency.

At 440, the UE 415 may transmit a beam pair indication to the base station 405. The beam pair indication may include an indication of the beam pair selected at 435. In some examples, the beam pair indication may include a feedback message (e.g., CSI report).

Figure 5:
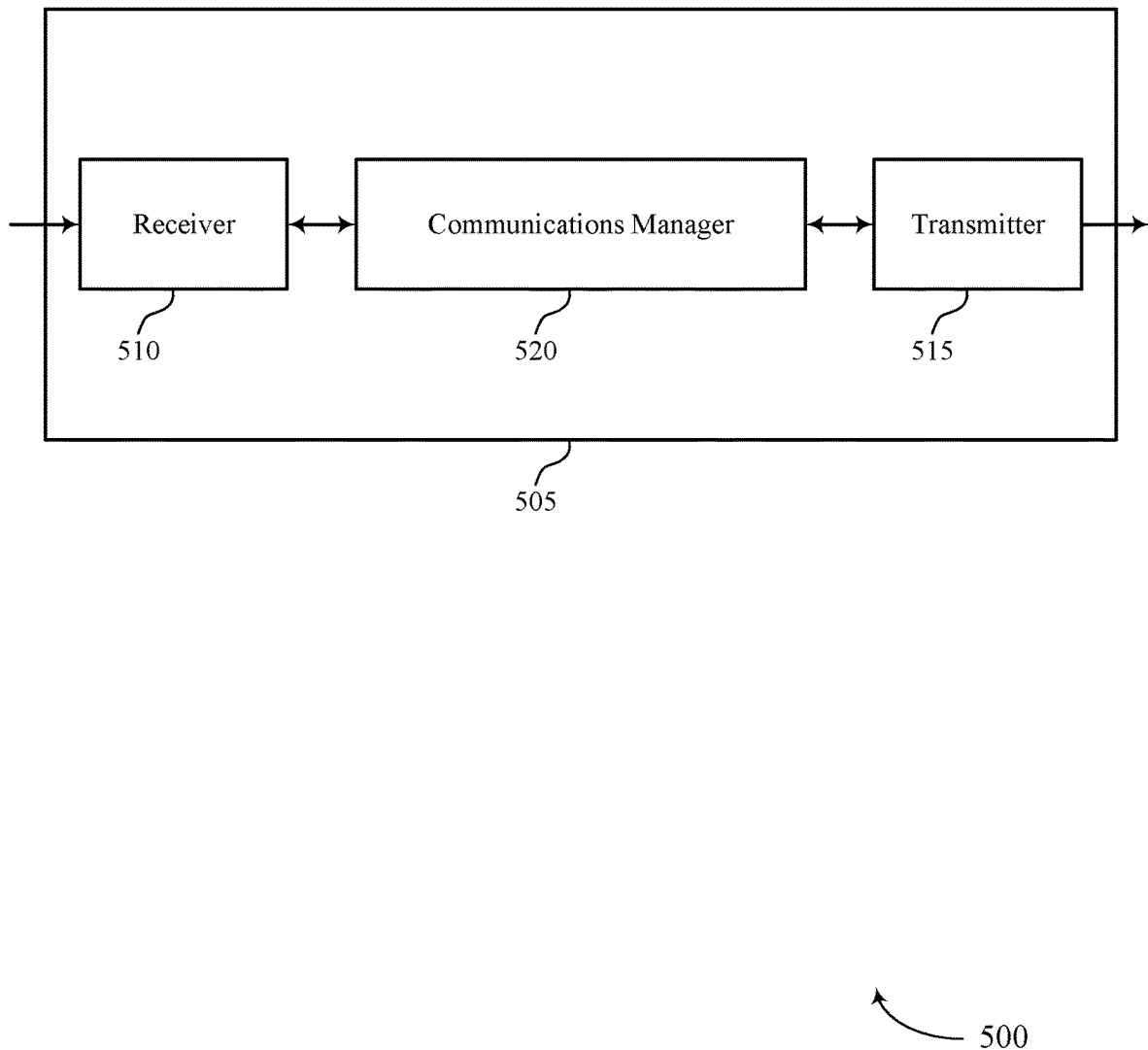
FIGS. 5 and 6 show block diagrams of devices that support techniques for managing beams using spectral efficiency estimates of two port reference signals in accordance with various aspects of the present disclosure.

FIG. 5 shows a block diagram 500 of a device 505 that supports techniques for managing beams using spectral efficiency estimates of two port reference signals in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for managing beams using spectral efficiency estimates of two port reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for managing beams using spectral efficiency estimates of two port reference signals). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for managing beams using spectral efficiency estimates of two port reference signals as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE. The communications manager 520 may be configured as or otherwise support a means for determining an estimate of spectral efficiency for each multi-port reference signal of the set of multiple multi-port reference signals based on the receiving. The communications manager 520 may be configured as or otherwise support a means for selecting a beam pair for communications with the base station based on the determined estimate of spectral efficiency for each multi-port reference signal. The communications manager 520 may be configured as or otherwise support a means for transmitting an indication of the selected beam pair to the base station.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased efficiency. For example, by utilizing multi-port reference signals for beam pair selection, the device 505 may make accurate rate or spectral efficiency measurements which may allow the device 505 to select a beam pair with the highest spectral efficiency or rate.

Figure 6:
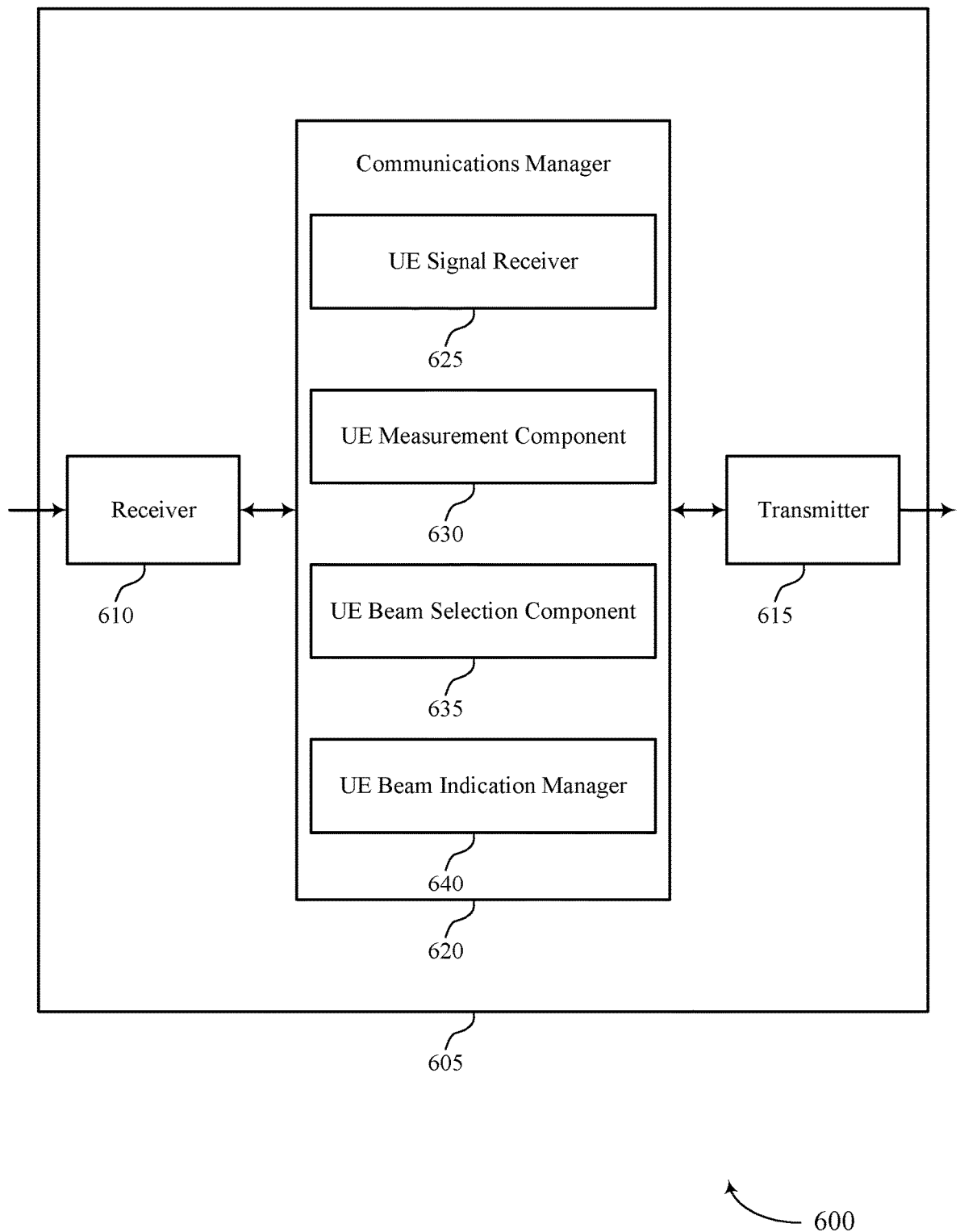

FIG. 6 shows a block diagram 600 of a device 605 that supports techniques for managing beams using spectral efficiency estimates of two port reference signals in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing beams using spectral efficiency estimates of two port reference signals). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for managing beams using spectral efficiency estimates of two port reference signals). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for managing beams using spectral efficiency estimates of two port reference signals as described herein. For example, the communications manager 620 may include a UE signal receiver 625, a UE measurement component 630, a UE beam selection component 635, a UE beam indication manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The UE signal receiver 625 may be configured as or otherwise support a means for receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE. The UE measurement component 630 may be configured as or otherwise support a means for determining an estimate of spectral efficiency for each multi-port reference signal of the set of multiple multi-port reference signals based on the receiving. The UE beam selection component 635 may be configured as or otherwise support a means for selecting a beam pair for communications with the base station based on the determined estimate of spectral efficiency for each multi-port reference signal. The UE beam indication manager 640 may be configured as or otherwise support a means for transmitting an indication of the selected beam pair to the base station.

Figure 7:
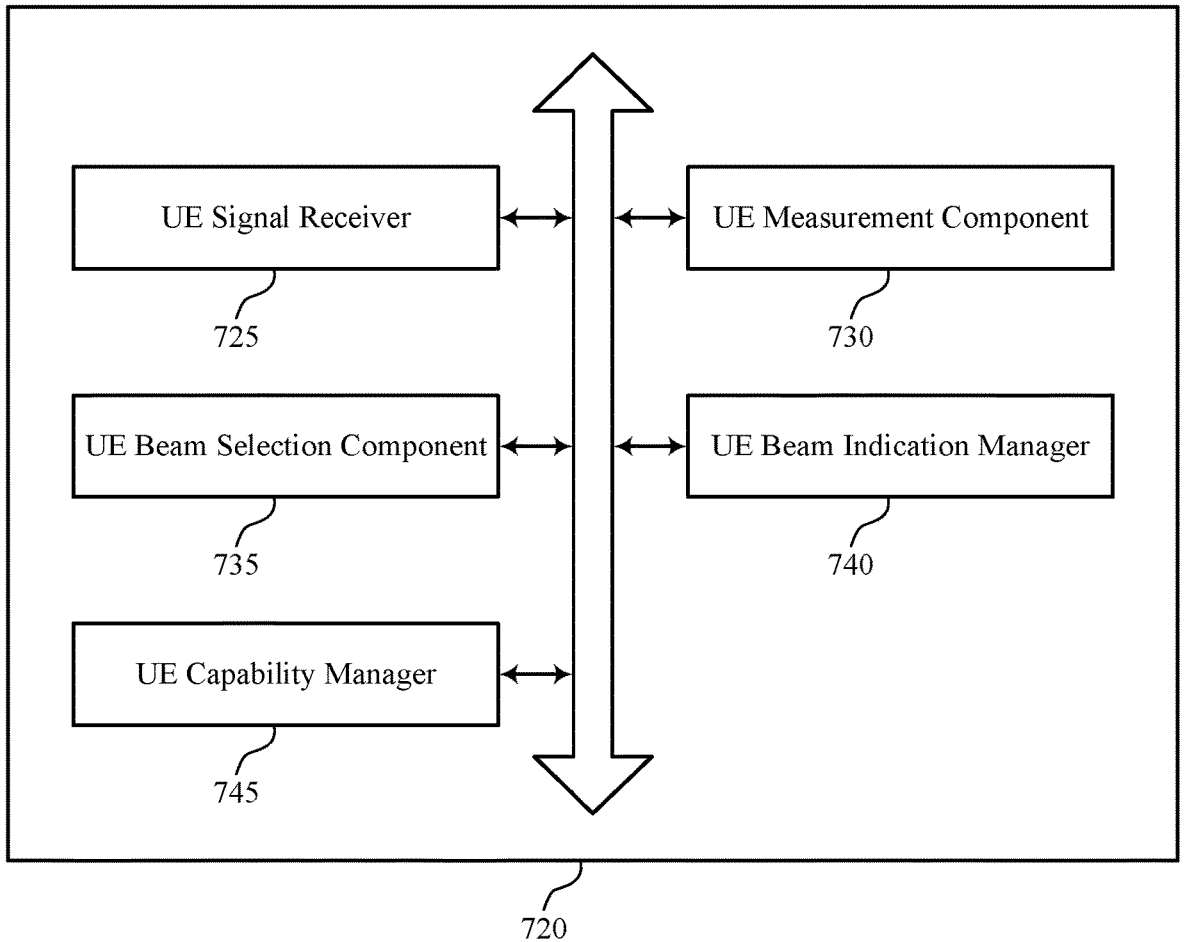
FIG. 7 shows a block diagram of a communications manager that supports techniques for managing beams using spectral efficiency estimates of two port reference signals in accordance with various aspects of the present disclosure.

FIG. 7 shows a block diagram 700 of a communications manager 720 that supports techniques for managing beams using spectral efficiency estimates of two port reference signals in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for managing beams using spectral efficiency estimates of two port reference signals as described herein. For example, the communications manager 720 may include a UE signal receiver 725, a UE measurement component 730, a UE beam selection component 735, a UE beam indication manager 740, a UE capability manager 745, or any combination thereof. Each of these components may communicate, directly or indirectly, with one another (e.g., via one or more buses).

The UE signal receiver 725 may be configured as or otherwise support a means for receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE. The UE measurement component 730 may be configured as or otherwise support a means for determining an estimate of spectral efficiency for each multi-port reference signal of the set of multiple multi-port reference signals based on the receiving. The UE beam selection component 735 may be configured as or otherwise support a means for selecting a beam pair for communications with the base station based on the determined estimate of spectral efficiency for each multi-port reference signal. The UE beam indication manager 740 may be configured as or otherwise support a means for transmitting an indication of the selected beam pair to the base station.

In some examples, the UE capability manager 745 may be configured as or otherwise support a means for determining a capability of the UE to use multi-port reference signals for beam management. In some examples, the UE capability manager 745 may be configured as or otherwise support a means for transmitting, to the base station, a message indicating the capability of the UE to use multi-port reference signals for beam management, where the estimate of spectral efficiency is determined based on the capability of the UE to use multi-port reference signals for beam management.

In some examples, the UE signal receiver 725 may be configured as or otherwise support a means for receiving the set of multiple multi-port reference signals in response to the transmitted message indicating the capability of the UE to use multi-port reference signals for beam management.

In some examples, to support determining the estimate of spectral efficiency, the UE measurement component 730 may be configured as or otherwise support a means for determining a phase information for each multi-port reference signal of the set of multiple multi-port reference signals.

In some examples, the phase information for each multi-port reference signal of the set of multiple multi-port reference signals includes a relative phase information for each multi-port reference signal of the set of multiple multi-port reference signals with respect to a baseline phase.

In some examples, to support determining the phase information, the UE measurement component 730 may be configured as or otherwise support a means for determining the phase information using a phase-locked loop component of a circuit of the UE based on a capability of the UE to use multi-port reference signals for beam management, the phase information corresponding to both the first polarization and the second polarization of the UE. In some examples, the circuit includes a radio frequency integrated circuit (RFIC).

In some examples, the UE measurement component 730 may be configured as or otherwise support a means for determining a lower bound of the estimate of spectral efficiency for each multi-port reference signal of the set of multiple multi-port reference signals based on a capability of the UE and an estimate of the phase information. In some examples, the estimate of the phase information includes a worst-case phase estimate for each multi-port reference signal of the set of multiple multi-port reference signals. In some examples, the lower bound of the estimate of spectral efficiency corresponds to a spectral efficiency estimate below a threshold.

In some examples, to support determining the estimate of spectral efficiency, the UE measurement component 730 may be configured as or otherwise support a means for determining respective signal strengths for each multi-port reference signal of the set of multiple multi-port reference signals, where a respective estimate of spectral efficiency for each of the set of multiple multi-port reference signals is determined based on a respective signal strength.

In some examples, to support determining the respective signal strengths, the UE measurement component 730 may be configured as or otherwise support a means for determining respective RSRP values or SNR values for each multi-port reference signal of the set of multiple multi-port reference signals.

In some examples, to support determining the estimate of spectral efficiency, the UE measurement component 730 may be configured as or otherwise support a means for determining respective estimates of spectral efficiency for a set of polarization mappings for each multi-port reference signal of the set of multi-port reference signals, each polarization mapping of the set of polarization mappings corresponding to a different mapping between one of the first polarization or the second polarization at the UE and one of the first polarization or the second polarization at the base station.

In some examples, the different mapping includes one of a mapping between the first polarization of the UE and the first polarization of the base station, a mapping between the second polarization of the UE and the second polarization of the base station, a mapping between the first polarization of the UE and the second polarization of the base station, or a mapping between the second polarization of the UE and the first polarization of the base station.

In some examples, to support selecting the beam pair, the UE beam selection component 735 may be configured as or otherwise support a means for selecting the beam pair corresponding to a multi-port reference signal of the set of multiple multi-port reference signals associated with a greatest spectral efficiency of a set of spectral efficiencies for the set of multiple multi-port reference signals.

In some examples, to support transmitting the indication of the selected beam pair, the UE beam indication manager 740 may be configured as or otherwise support a means for transmitting a feedback message including a transmission configuration indicator (TCI) indicative of the selected beam pair. In some examples, each of the set of multiple multi-port reference signals includes a two-port CSI-RS. In some examples, the two-port CSI-RS includes a periodic CSI-RS or an aperiodic CSI-RS. In some examples, the first directional beam and the second directional beam may include a beam that is associated with any set of beam weights or beam parameters for transmission of a signal.

Figure 8:
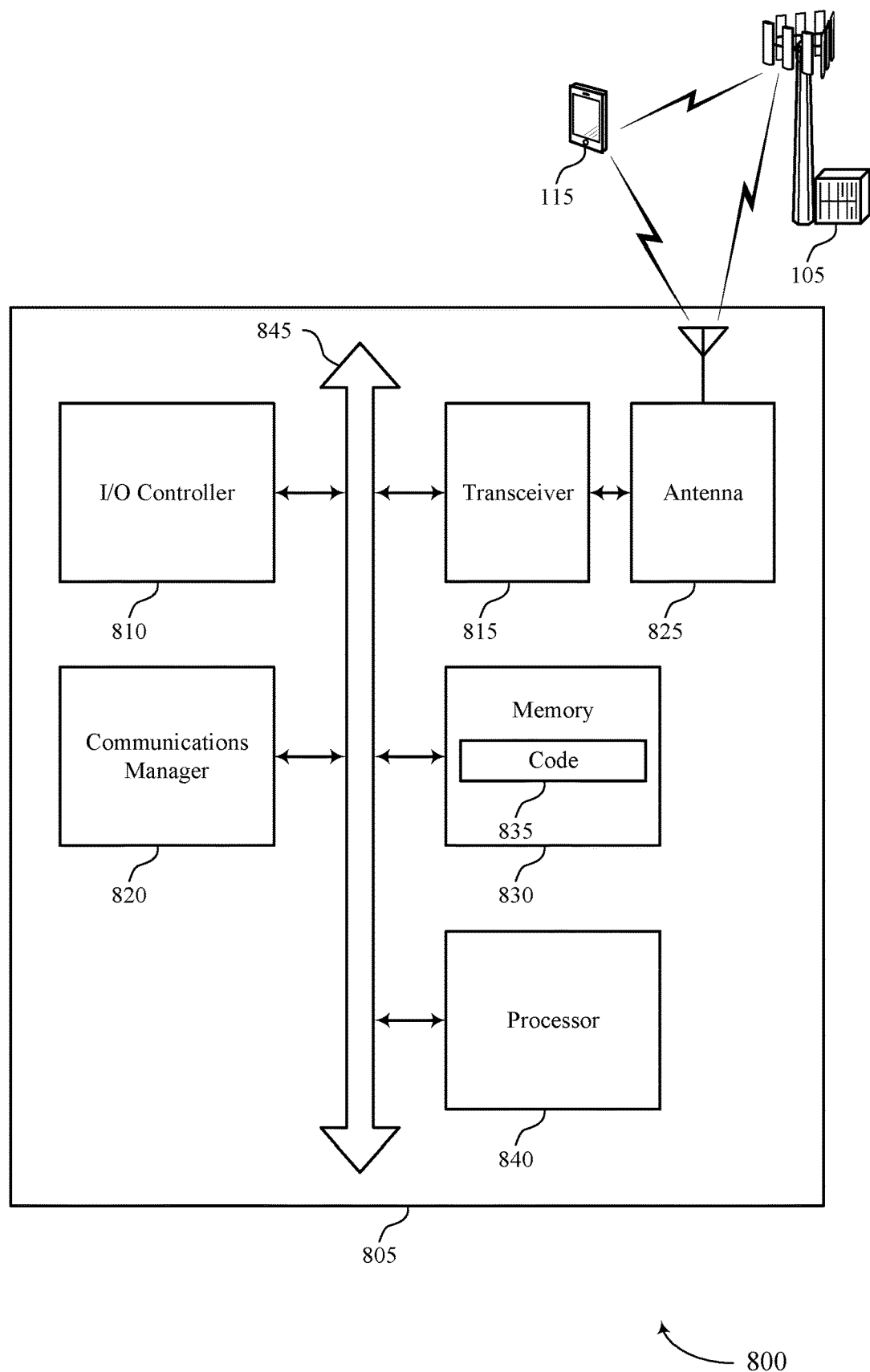
FIG. 8 shows a diagram of a system including a device that supports techniques for managing beams using spectral efficiency estimates of two port reference signals in accordance with various aspects of the present disclosure.

FIG. 8 shows a diagram of a system 800 including a device 805 that supports techniques for managing beams using spectral efficiency estimates of two port reference signals in accordance with various aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for managing beams using spectral efficiency estimates of two port reference signals). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE. The communications manager 820 may be configured as or otherwise support a means for determining an estimate of spectral efficiency for each multi-port reference signal of the set of multiple multi-port reference signals based on the receiving. The communications manager 820 may be configured as or otherwise support a means for selecting a beam pair for communications with the base station based on the determined estimate of spectral efficiency for each multi-port reference signal. The communications manager 820 may be configured as or otherwise support a means for transmitting an indication of the selected beam pair to the base station.

By including or configuring the communications manager 820 in accordance with examples as described herein, the device 805 may support techniques for improved communication reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for managing beams using spectral efficiency estimates of two port reference signals as described herein, or the processor 840 and the memory 830 may be otherwise configured to perform or support such operations.

Figure 9:
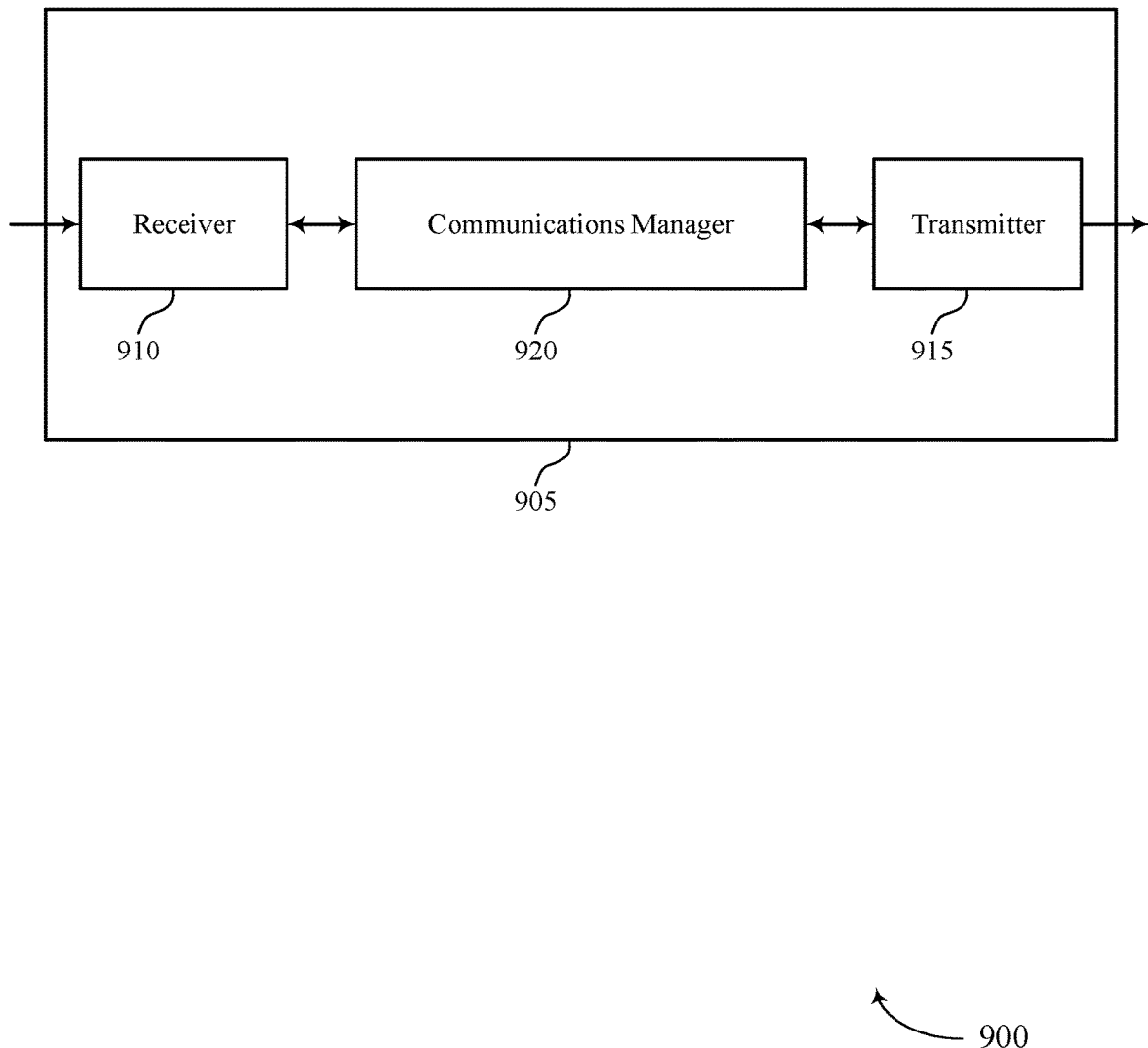
FIGS. 9 and 10 show block diagrams of devices that support techniques for managing beams using spectral efficiency estimates of two port reference signals in accordance with various aspects of the present disclosure.

FIG. 9 shows a block diagram 900 of a device 905 that supports techniques for managing beams using spectral efficiency estimates of two port reference signals in accordance with various aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing beams using spectral efficiency estimates of two port reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing beams using spectral efficiency estimates of two port reference signals). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for managing beams using spectral efficiency estimates of two port reference signals as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a message indicating a capability of the UE to use multi-port reference signals for beam management. The communications manager 920 may be configured as or otherwise support a means for transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station. The communications manager 920 may be configured as or otherwise support a means for receiving, from the UE, an indication of a beam pair for communications between the UE and the base station based on transmitting.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increased efficiency.

Figure 10:
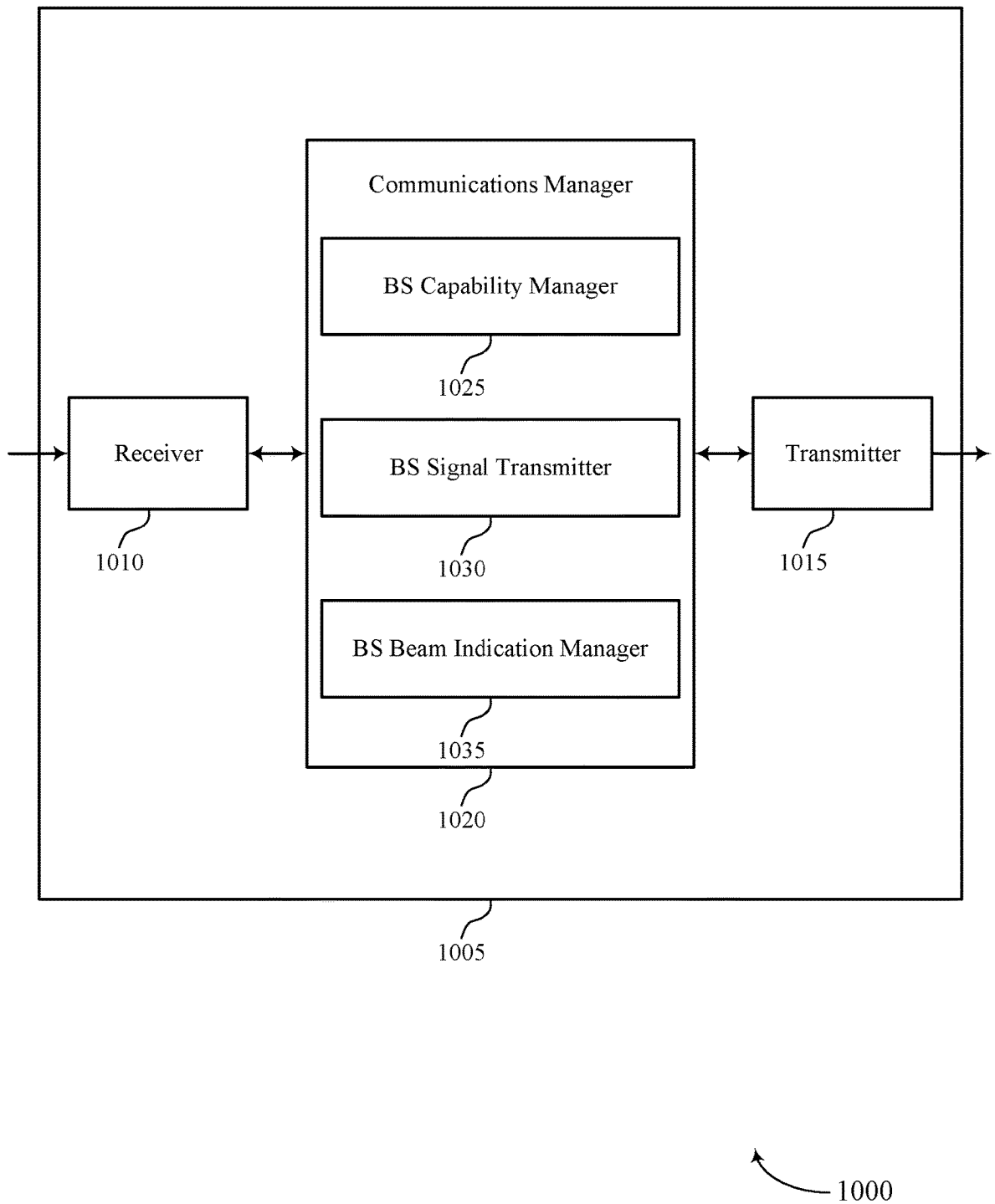

FIG. 10 shows a block diagram 1000 of a device 1005 that supports techniques for managing beams using spectral efficiency estimates of two port reference signals in accordance with various aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing beams using spectral efficiency estimates of two port reference signals). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing beams using spectral efficiency estimates of two port reference signals). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for managing beams using spectral efficiency estimates of two port reference signals as described herein. For example, the communications manager 1020 may include a BS capability manager 1025, a BS signal transmitter 1030, a BS beam indication manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The BS capability manager 1025 may be configured as or otherwise support a means for receiving, from a UE, a message indicating a capability of the UE to use multi-port reference signals for beam management. The BS signal transmitter 1030 may be configured as or otherwise support a means for transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station. The BS beam indication manager 1035 may be configured as or otherwise support a means for receiving, from the UE, an indication of a beam pair for communications between the UE and the base station based on transmitting.

Figure 11:
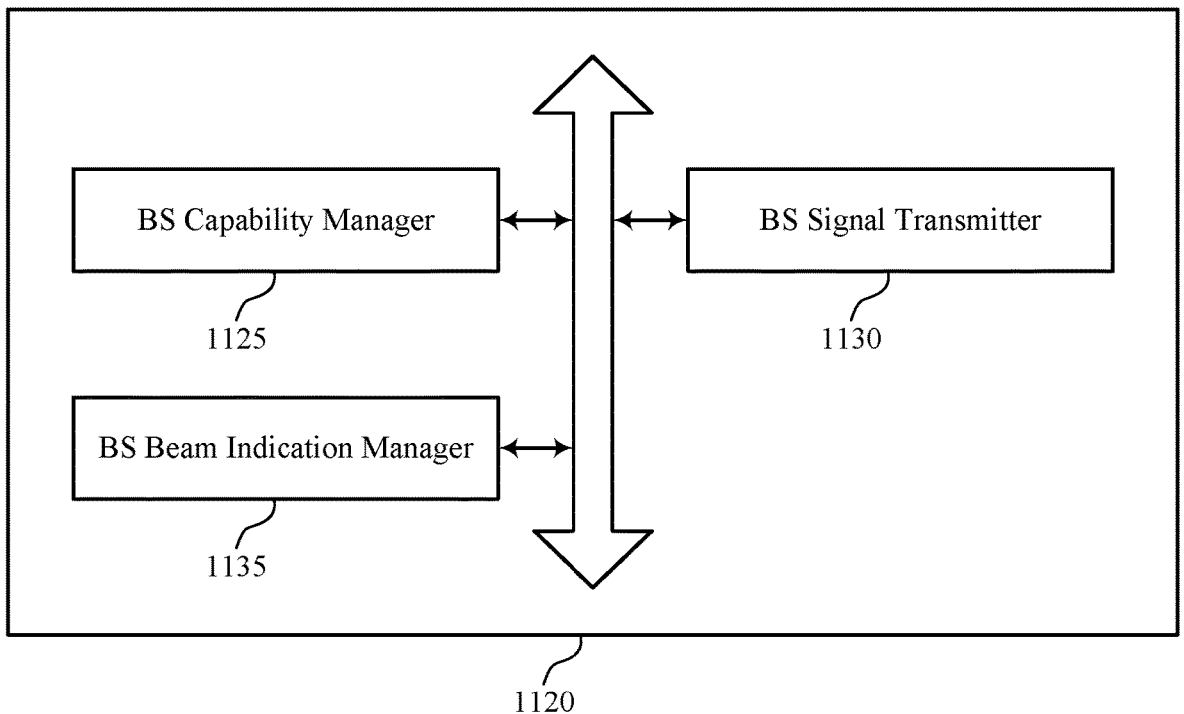
FIG. 11 shows a block diagram of a communications manager that supports techniques for managing beams using spectral efficiency estimates of two port reference signals in accordance with various aspects of the present disclosure.

FIG. 11 shows a block diagram 1100 of a communications manager 1120 that supports techniques for managing beams using spectral efficiency estimates of two port reference signals in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing beams using spectral efficiency estimates of two port reference signals as described herein. For example, the communications manager 1120 may include a BS capability manager 1125, a BS signal transmitter 1130, a BS beam indication manager 1135, or any combination thereof. Each of these components may communicate, directly or indirectly, with one another (e.g., via one or more buses).

The communications manager 1120 may support wireless communications at a base station in accordance with examples as disclosed herein. The BS capability manager 1125 may be configured as or otherwise support a means for receiving, from a UE, a message indicating a capability of the UE to use multi-port reference signals for beam management. The BS signal transmitter 1130 may be configured as or otherwise support a means for transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station. The BS beam indication manager 1135 may be configured as or otherwise support a means for receiving, from the UE, an indication of a beam pair for communications between the UE and the base station based on transmitting.

In some examples, to support receiving the indication of the beam pair, the BS beam indication manager 1135 may be configured as or otherwise support a means for receiving a feedback message including a transmission configuration indicator (TCI) indicative of the beam pair. In some examples, each of the set of multiple multi-port reference signals includes a two-port CSI-RS. In some examples, the two-port CSI-RS includes a periodic CSI-RS or an aperiodic CSI-RS.

Figure 12:
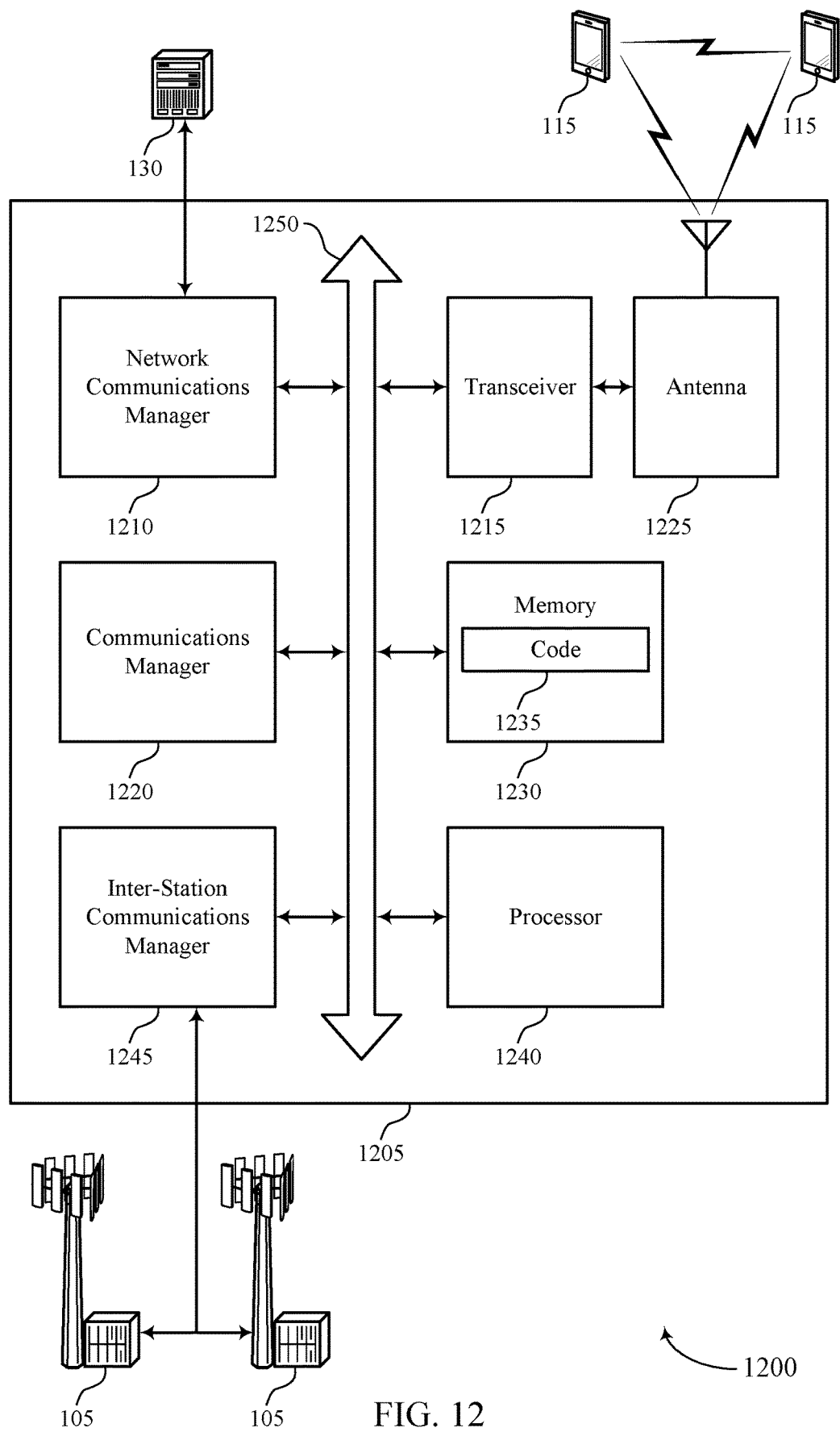
FIG. 12 shows a diagram of a system including a device that supports techniques for managing beams using spectral efficiency estimates of two port reference signals in accordance with various aspects of the present disclosure.

FIG. 12 shows a diagram of a system 1200 including a device 1205 that supports techniques for managing beams using spectral efficiency estimates of two port reference signals in accordance with various aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing beams using spectral efficiency estimates of two port reference signals). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a message indicating a capability of the UE to use multi-port reference signals for beam management. The communications manager 1220 may be configured as or otherwise support a means for transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station. The communications manager 1220 may be configured as or otherwise support a means for receiving, from the UE, an indication of a beam pair for communications between the UE and the base station based on transmitting.

By including or configuring the communications manager 1220 in accordance with examples as described herein, the device 1205 may support techniques improved communication reliability and reduced latency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing beams using spectral efficiency estimates of two port reference signals as described herein, or the processor 1240 and the memory 1230 may be otherwise configured to perform or support such operations.

Figure 13:
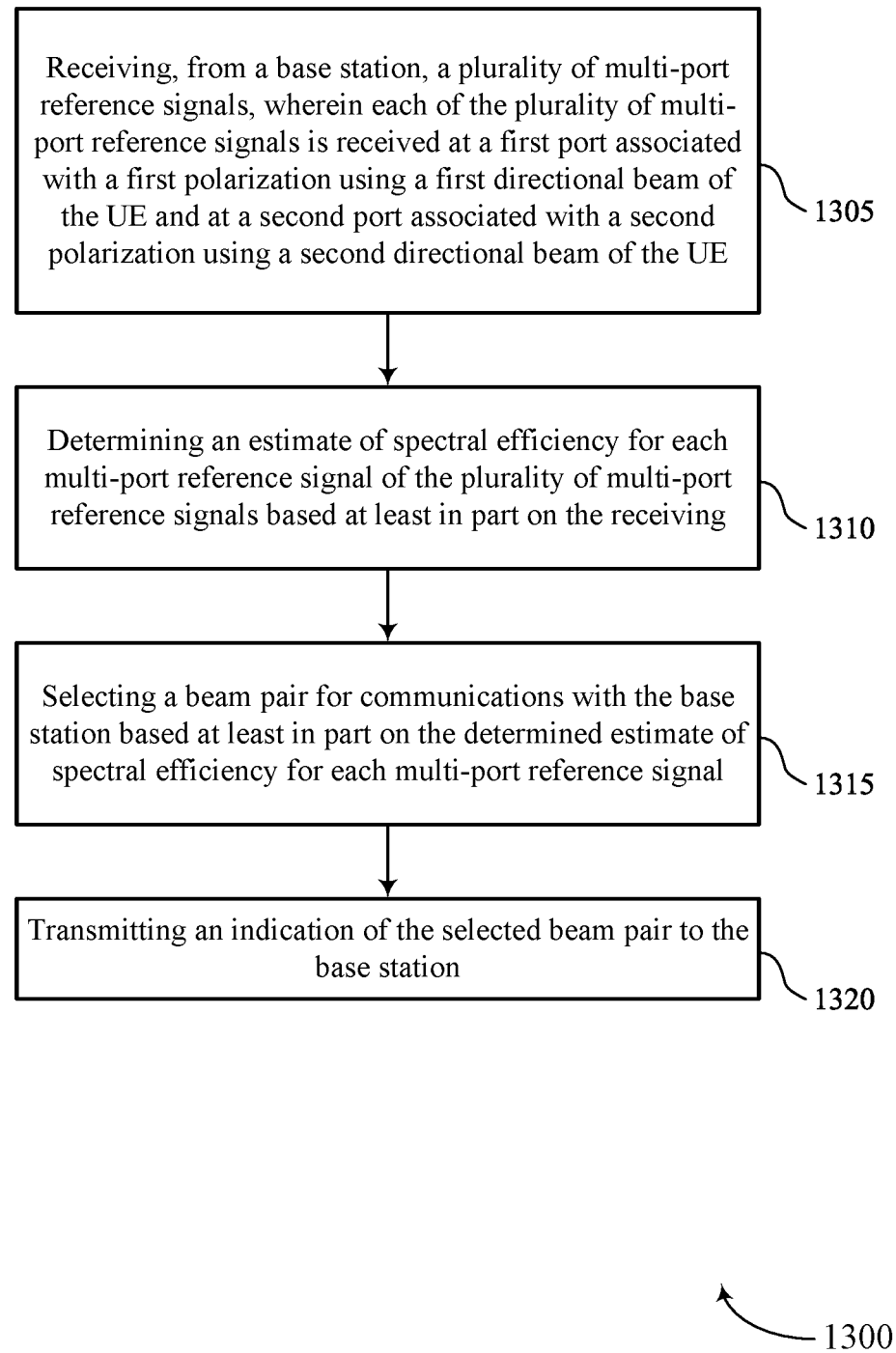
FIGS. 13 through 15 show flowcharts illustrating methods that support techniques for managing beams using spectral efficiency estimates of two port reference signals in accordance with various aspects of the present disclosure.

FIG. 13 shows a flowchart illustrating a method 1300 that supports techniques for managing beams using spectral efficiency estimates of two port reference signals in accordance with various aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE. The operations of 1305 may be performed in accordance with examples as disclosed herein. In some examples, aspects of the operations of 1305 may be performed by a UE signal receiver 725 as described with reference to FIG. 7.

At 1310, the method may include determining an estimate of spectral efficiency for each multi-port reference signal of the set of multiple multi-port reference signals based on the receiving. The operations of 1310 may be performed in accordance with examples as disclosed herein. In some examples, aspects of the operations of 1310 may be performed by a UE measurement component 730 as described with reference to FIG. 7.

At 1315, the method may include selecting a beam pair for communications with the base station based on the determined estimate of spectral efficiency for each multi-port reference signal. The operations of 1315 may be performed in accordance with examples as disclosed herein. In some examples, aspects of the operations of 1315 may be performed by a UE beam selection component 735 as described with reference to FIG. 7.

At 1320, the method may include transmitting an indication of the selected beam pair to the base station. The operations of 1320 may be performed in accordance with examples as disclosed herein. In some examples, aspects of the operations of 1320 may be performed by a UE beam indication manager 740 as described with reference to FIG. 7.

Figure 14:
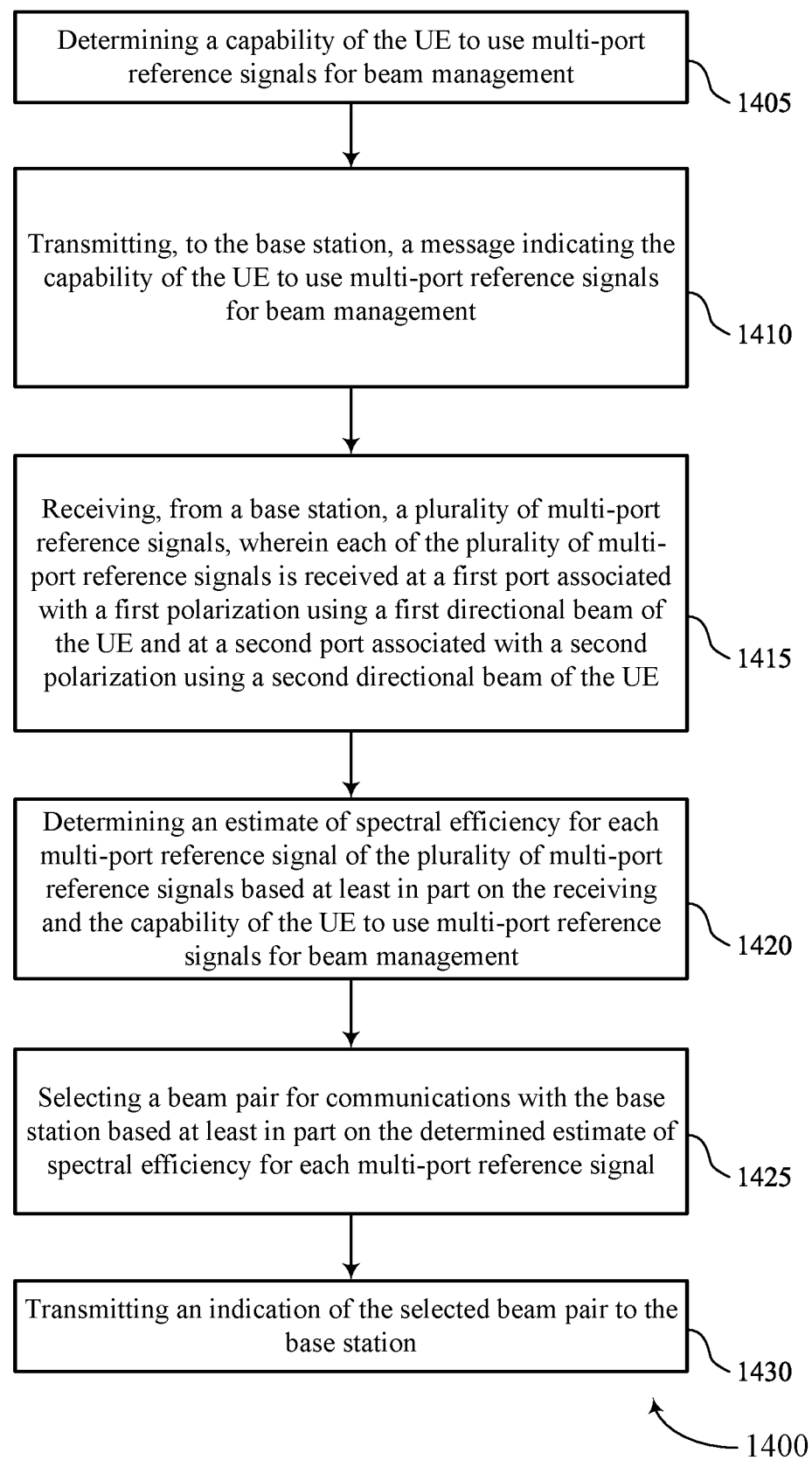

FIG. 14 shows a flowchart illustrating a method 1400 that supports techniques for managing beams using spectral efficiency estimates of two port reference signals in accordance with various aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include determining a capability of the UE to use multi-port reference signals for beam management. The operations of 1405 may be performed in accordance with examples as disclosed herein. In some examples, aspects of the operations of 1405 may be performed by a UE capability manager 745 as described with reference to FIG. 7.

At 1410, the method may include transmitting, to the base station, a message indicating the capability of the UE to use multi-port reference signals for beam management. The operations of 1410 may be performed in accordance with examples as disclosed herein. In some examples, aspects of the operations of 1410 may be performed by a UE capability manager 745 as described with reference to FIG. 7.

At 1415, the method may include receiving, from a base station, a set of multiple multi-port reference signals, where each of the set of multiple multi-port reference signals is received at a first port associated with a first polarization using a first directional beam of the UE and at a second port associated with a second polarization using a second directional beam of the UE. The operations of 1415 may be performed in accordance with examples as disclosed herein. In some examples, aspects of the operations of 1415 may be performed by a UE signal receiver 725 as described with reference to FIG. 7.

At 1420, the method may include determining an estimate of spectral efficiency for each multi-port reference signal of the set of multiple multi-port reference signals based on the receiving and the capability of the UE to use multi-port reference signals for beam management. The operations of 1420 may be performed in accordance with examples as disclosed herein. In some examples, aspects of the operations of 1420 may be performed by a UE measurement component 730 as described with reference to FIG. 7.

At 1425, the method may include selecting a beam pair for communications with the base station based on the determined estimate of spectral efficiency for each multi-port reference signal. The operations of 1425 may be performed in accordance with examples as disclosed herein. In some examples, aspects of the operations of 1425 may be performed by a UE beam selection component 735 as described with reference to FIG. 7.

At 1430, the method may include transmitting an indication of the selected beam pair to the base station. The operations of 1430 may be performed in accordance with examples as disclosed herein. In some examples, aspects of the operations of 1430 may be performed by a UE beam indication manager 740 as described with reference to FIG. 7.

Figure 15:
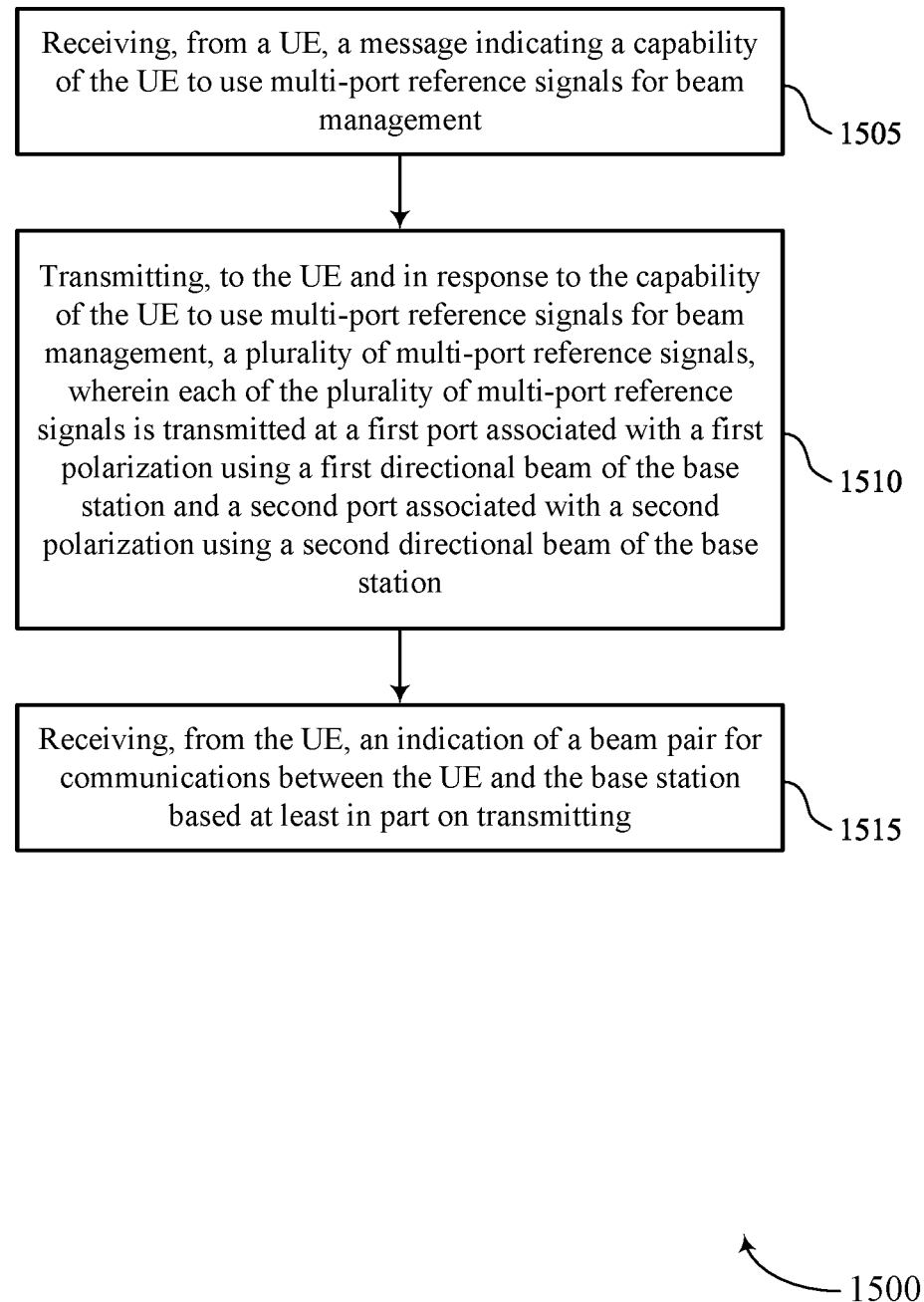

FIG. 15 shows a flowchart illustrating a method 1500 that supports techniques for managing beams using spectral efficiency estimates of two port reference signals in accordance with various aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a message indicating a capability of the UE to use multi-port reference signals for beam management. The operations of 1505 may be performed in accordance with examples as disclosed herein. In some examples, aspects of the operations of 1505 may be performed by a BS capability manager 1125 as described with reference to FIG. 11.

At 1510, the method may include transmitting, to the UE and in response to the capability of the UE to use multi-port reference signals for beam management, a set of multiple multi-port reference signals, where each of the set of multiple multi-port reference signals is transmitted at a first port associated with a first polarization using a first directional beam of the base station and a second port associated with a second polarization using a second directional beam of the base station. The operations of 1510 may be performed in accordance with examples as disclosed herein. In some examples, aspects of the operations of 1510 may be performed by a BS signal transmitter 1130 as described with reference to FIG. 11.

At 1515, the method may include receiving, from the UE, an indication of a beam pair for communications between the UE and the base station based on transmitting. The operations of 1515 may be performed in accordance with examples as disclosed herein. In some examples, aspects of the operations of 1515 may be performed by a BS beam indication manager 1135 as described with reference to FIG. 11.

The following provides an overview of aspects of the present disclosure:

Aspect 1: A method of wireless communications at a UE comprising: receiving, from a base station, a plurality of multi-port reference signals, wherein each of the plurality of multi-port reference signals is received at a first port associated with a first polarization using a first directional beam of the UE and at a second port associated with a second polarization using a second directional beam of the UE; determining an estimate of spectral efficiency for each multi-port reference signal of the plurality of multi-port reference signals based at least in part on the receiving; selecting a beam pair for communications with the base station based at least in part on the determined estimate of spectral efficiency for each multi-port reference signal; and transmitting an indication of the selected beam pair to the base station.

Aspect 2: The method of aspect 1, further comprising: determining a capability of the UE to use multi-port reference signals for beam management; and transmitting, to the base station, a message indicating the capability of the UE to use multi-port reference signals for beam management, wherein the estimate of spectral efficiency is determined based at least in part on the capability of the UE to use multi-port reference signals for beam management.

Aspect 3: The method of aspect 2, further comprising: receiving the plurality of multi-port reference signals in response to the transmitted message indicating the capability of the UE to use multi-port reference signals for beam management.

Aspect 4: The method of any of aspects 1 through 3, wherein determining the estimate of spectral efficiency comprises: determining a phase information for each multi-port reference signal of the plurality of multi-port reference signals.

Aspect 5: The method of aspect 4, wherein the phase information for each multi-port reference signal of the plurality of multi-port reference signals comprises a relative phase information for each multi-port reference signal of the plurality of multi-port reference signals with respect to a baseline phase.

Aspect 6: The method of aspect 4, wherein determining the phase information comprises: determining the phase information using a PLL component of a circuit of the UE based at least in part on a capability of the UE to use multi-port reference signals for beam management, the phase information corresponding to both the first polarization and the second polarization of the UE.

Aspect 7: The method of aspect 6, wherein the circuit comprises a radio frequency integrated circuit (RFIC).

Aspect 8: The method of aspect 4, further comprising: determining a lower bound of the estimate of spectral efficiency for each multi-port reference signal of the plurality of multi-port reference signals based at least in part on a capability of the UE and an estimate of the phase information.

Aspect 9: The method of aspect 8, wherein the estimate of the phase information comprises a worst-case phase estimate for each multi-port reference signal of the plurality of multi-port reference signals.

Aspect 10: The method of aspect 8, wherein the lower bound of the estimate of spectral efficiency corresponds to a spectral efficiency estimate below a threshold.

Aspect 11: The method of any of aspects 1 through 10, wherein determining the estimate of spectral efficiency comprises: determining respective signal strengths for each multi-port reference signal of the plurality of multi-port reference signals, wherein a respective estimate of spectral efficiency for each of the plurality of multi-port reference signals is determined based at least in part on a respective signal strength.

Aspect 12: The method of aspect 11, wherein determining the respective signal strengths comprises: determining respective RSRP values or SNR values for each multi-port reference signal of the plurality of multi-port reference signals.

Aspect 13: The method of any of aspects 1 through 12, wherein determining the estimate of spectral efficiency comprises: determining respective estimates of spectral efficiency for a set of polarization mappings for each multi-port reference signal of the plurality of multi-port reference signals, each polarization mapping of the set of polarization mappings corresponding to a different mapping between one of the first polarization or the second polarization at the UE and one of the first polarization or the second polarization at the base station.

Aspect 14: The method of aspect 13, wherein the different mapping comprises one of a mapping between the first polarization of the UE and the first polarization of the base station, a mapping between the second polarization of the UE and the second polarization of the base station, a mapping between the first polarization of the UE and the second polarization of the base station, or a mapping between the second polarization of the UE and the first polarization of the base station.

Aspect 15: The method of any of aspects 1 through 14, wherein selecting the beam pair comprises: selecting the beam pair corresponding to a multi-port reference signal of the plurality of multi-port reference signals associated with a greatest spectral efficiency of a set of spectral efficiencies for the plurality of multi-port reference signals.

Aspect 16: The method of any of aspects 1 through 15, wherein transmitting the indication of the selected beam pair comprises: transmitting a feedback message comprising a TCI indicative of the selected beam pair.

Aspect 17: The method of any of aspects 1 through 16, wherein each of the plurality of multi-port reference signals comprises a two-port CSI-RS.

Aspect 18: The method of aspect 17, wherein the two-port CSI-RS comprises a periodic CSI-RS or an aperiodic CSI-RS.

Aspect 19: The method of any of the aspects 1 through 18, wherein the first directional beam and the second directional beam comprise a beam that is associated with any set of beam weights or set of beam parameters for transmission of a signal.

Aspect 20: A method for wireless communications at a base station, comprising: receiving, from a UE, a message indicating a capability of the UE to use multi-port reference signals for beam management; transmitting, to the UE and in response to the capability of the UE to use multi-port reference signals for beam management, a plurality of multi-port reference signals, wherein each of the plurality of multi-port reference signals is transmitted at a first port associated with a first polarization using a first directional beam of the base station and a second port associated with a second polarization using a second directional beam of the base station; and receiving, from the UE, an indication of a beam pair for communications between the UE and the base station based at least in part on transmitting.

Aspect 21: The method of aspect 20, wherein receiving the indication of the beam pair comprises: receiving a feedback message comprising a transmission configuration indicator (TCI) indicative of the beam pair.

Aspect 22: The method of any of aspects 20 and 21, wherein each of the plurality of multi-port reference signals comprises a two-port CSI-RS.

Aspect 23: The method of aspect 22, wherein the two-port CSI-RS comprises a periodic CSI-RS or an aperiodic CSI-RS.

Aspect 24: An apparatus comprising a processor; memory coupled with the processor; and instructions stored in the memory and executable by the processor to cause the apparatus to perform a method of any of aspects 1 through 19.

Aspect 25: An apparatus comprising at least one means for performing a method of any of aspects 1 through 19.

Aspect 26: A non-transitory computer-readable medium storing code the code comprising instructions executable by a processor to perform a method of any of aspects 1 through 19.

Aspect 27: An apparatus for wireless communications at a base station, comprising a processor; memory coupled with the processor; and instructions stored in the memory and executable by the processor to cause the apparatus to perform a method of any of aspects 20 through 23.

Aspect 28: An apparatus for wireless communications at a base station, comprising at least one means for performing a method of any of aspects 20 through 23.

Aspect 29: A non-transitory computer-readable medium storing code for wireless communications at a base station, the code comprising instructions executable by a processor to perform a method of any of aspects 20 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communications at a user equipment (UE) comprising:
receiving, from a base station, a plurality of multi-port reference signals, wherein each of the plurality of multi-port reference signals is received at a first port associated with a first polarization using a first directional beam of the UE and at a second port associated with a second polarization using a second directional beam of the UE;
determining an estimate of spectral efficiency for each multi-port reference signal of the plurality of multi-port reference signals based at least in part on the receiving;
selecting a beam pair for communications with the base station based at least in part on the determined estimate of spectral efficiency for each multi-port reference signal; and
transmitting an indication of the selected beam pair to the base station.

2. The method of claim 1, further comprising:
determining a capability of the UE to use multi-port reference signals for beam management; and
transmitting, to the base station, a message indicating the capability of the UE to use multi-port reference signals for beam management, wherein the estimate of spectral efficiency is determined based at least in part on the capability of the UE to use multi-port reference signals for beam management.

3. The method of claim 2, further comprising:
receiving the plurality of multi-port reference signals in response to the transmitted message indicating the capability of the UE to use multi-port reference signals for beam management.

4. The method of claim 1, wherein determining the estimate of spectral efficiency comprises:
determining a phase information for each multi-port reference signal of the plurality of multi-port reference signals.

5. The method of claim 4, wherein the phase information for each multi-port reference signal of the plurality of multi-port reference signals comprises a relative phase information for each multi-port reference signal of the plurality of multi-port reference signals with respect to a baseline phase.

6. The method of claim 4, wherein determining the phase information comprises:
determining the phase information using a phase-locked loop component of a circuit of the UE based at least in part on a capability of the UE to use multi-port reference signals for beam management, the phase information corresponding to both the first polarization and the second polarization of the UE.

7. The method of claim 6, wherein the circuit comprises a radio frequency integrated circuit (RFIC).

8. The method of claim 4, further comprising:
determining a lower bound of the estimate of spectral efficiency for each multi-port reference signal of the plurality of multi-port reference signals based at least in part on a capability of the UE and an estimate of the phase information.

9. The method of claim 8, wherein the estimate of the phase information comprises a worst-case phase estimate for each multi-port reference signal of the plurality of multi-port reference signals.

10. The method of claim 8, wherein the lower bound of the estimate of spectral efficiency corresponds to a spectral efficiency estimate below a threshold.

11. The method of claim 1, wherein determining the estimate of spectral efficiency comprises:
determining respective signal strengths for each multi-port reference signal of the plurality of multi-port reference signals, wherein a respective estimate of spectral efficiency for each of the plurality of multi-port reference signals is determined based at least in part on a respective signal strength.

12. The method of claim 11, wherein determining the respective signal strengths comprises:
determining respective reference signal received power (RSRP) values or signal-to-noise ratio (SNR) values for each multi-port reference signal of the plurality of multi-port reference signals.

13. The method of claim 1, wherein determining the estimate of spectral efficiency comprises:
determining respective estimates of spectral efficiency for a set of polarization mappings for each multi-port reference signal of the plurality of multi-port reference signals, each polarization mapping of the set of polarization mappings corresponding to a different mapping between one of the first polarization or the second polarization at the UE and one of the first polarization or the second polarization at the base station.

14. The method of claim 13, wherein the different mapping comprises one of a mapping between the first polarization of the UE and the first polarization of the base station, a mapping between the second polarization of the UE and the second polarization of the base station, a mapping between the first polarization of the UE and the second polarization of the base station, or a mapping between the second polarization of the UE and the first polarization of the base station.

15. The method of claim 1, wherein selecting the beam pair comprises:
selecting the beam pair corresponding to a multi-port reference signal of the plurality of multi-port reference signals associated with a greatest spectral efficiency of a set of spectral efficiencies for the plurality of multi-port reference signals.

16. The method of claim 1, wherein transmitting the indication of the selected beam pair comprises:
transmitting a feedback message comprising a transmission configuration indicator (TCI) indicative of the selected beam pair.

17. The method of claim 1, wherein each of the plurality of multi-port reference signals comprises a two-port channel state information reference signal (CSI-RS).

18. The method of claim 17, wherein the two-port CSI-RS comprises a periodic CSI-RS or an aperiodic CSI-RS.

19. The method of claim 1, wherein the first directional beam and the second directional beam comprise a beam that is associated with any set of beam weights or set of beam parameters for transmission of a signal.

20. A method for wireless communications at a base station, comprising:
  receiving, from a user equipment (UE), a message indicating a capability of the UE to use multi-port reference signals for beam management;
  transmitting, to the UE and in response to the capability of the UE to use multi-port reference signals for beam management, a plurality of multi-port reference signals, wherein each of the plurality of multi-port reference signals is transmitted at a first port associated with a first polarization using a first directional beam of the base station and a second port associated with a second polarization using a second directional beam of the base station; and
  receiving, from the UE, an indication of a beam pair for communications between the UE and the base station based at least in part on transmitting.

21. The method of claim 20, wherein receiving the indication of the beam pair comprises:
  receiving a feedback message comprising a transmission configuration indicator (TCI) indicative of the beam pair.

22. The method of claim 20, wherein each of the plurality of multi-port reference signals comprises a two-port channel state information reference signal (CSI-RS).

23. The method of claim 22, wherein the two-port CSI-RS comprises a periodic CSI-RS or an aperiodic CSI-RS.

24. An apparatus for wireless communications at a user equipment (UE), comprising:
  a processor;
  memory coupled with the processor; and
  instructions stored in the memory and executable by the processor to cause the apparatus to:
    receive, from a base station, a plurality of multi-port reference signals, wherein each of the plurality of multi-port reference signals is received at a first port associated with a first polarization using a first directional beam of the UE and at a second port associated with a second polarization using a second directional beam of the UE;
    determine an estimate of spectral efficiency for each multi-port reference signal of the plurality of multi-port reference signals based at least in part on the receiving;
    select a beam pair for communications with the base station based at least in part on the determined estimate of spectral efficiency for each multi-port reference signal; and
    transmit an indication of the selected beam pair to the base station.

25. The apparatus of claim 24, wherein the instructions are further executable by the processor to cause the apparatus to:
  determine a capability of the UE to use multi-port reference signals for beam management; and
  transmit, to the base station, a message indicating the capability of the UE to use multi-port reference signals for beam management, wherein the estimate of spectral efficiency is determined based at least in part on the capability of the UE to use multi-port reference signals for beam management.

26. The apparatus of claim 24, wherein the instructions to determine the estimate of spectral efficiency are executable by the processor to cause the apparatus to:
  determine a phase information for each multi-port reference signal of the plurality of multi-port reference signals.

27. The apparatus of claim 26, wherein the instructions to determine the phase information are executable by the processor to cause the apparatus to:
  determine the phase information using a phase-locked loop component of a circuit of the UE based at least in part on a capability of the UE to use multi-port reference signals for beam management, the phase information corresponding to both the first polarization and the second polarization of the UE.

28. The apparatus of claim 24, wherein the instructions to determine the estimate of spectral efficiency are executable by the processor to cause the apparatus to:
  determine respective signal strengths for each multi-port reference signal of the plurality of multi-port reference signals, wherein a respective estimate of spectral efficiency for each of the plurality of multi-port reference signals is determined based at least in part on a respective signal strength.

29. The apparatus of claim 24, wherein the instructions to select the beam pair are executable by the processor to cause the apparatus to:
  select the beam pair corresponding to a multi-port reference signal of the plurality of multi-port reference signals associated with a greatest spectral efficiency of a set of spectral efficiencies for the plurality of multi-port reference signals.

30. An apparatus for wireless communications at a base station, comprising:
  a processor;
  memory coupled with the processor; and
  instructions stored in the memory and executable by the processor to cause the apparatus to:
    receive, from a user equipment (UE), a message indicating a capability of the UE to use multi-port reference signals for beam management;
    transmit, to the UE and in response to the capability of the UE to use multi-port reference signals for beam management, a plurality of multi-port reference signals, wherein each of the plurality of multi-port reference signals is transmitted at a first port associated with a first polarization using a first directional beam of the base station and a second port associated with a second polarization using a second directional beam of the base station; and
    receive, from the UE, an indication of a beam pair for communications between the UE and the base station based at least in part on transmitting.

* * * * *